(12) United States Patent
Ohori et al.

(10) Patent No.: US 12,368,986 B2
(45) Date of Patent: *Jul. 22, 2025

(54) ELECTRONIC APPARATUS

(71) Applicant: Nintendo Co., Ltd., Kyoto (JP)

(72) Inventors: Wakana Ohori, Kyoto (JP); Kazuhiro Maruyama, Kyoto (JP); Yoshitaka Tamura, Kyoto (JP); Masaya Takei, Kyoto (JP); Takahiro Sato, Kyoto (JP); Koji Saito, Kyoto (JP); Mitsuru Katayama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 331 days.

This patent is subject to a terminal disclaimer.

(21) Appl. No.: 18/127,562

(22) Filed: Mar. 28, 2023

(65) Prior Publication Data

US 2023/0239603 A1    Jul. 27, 2023

Related U.S. Application Data

(63) Continuation of application No. PCT/JP2021/034358, filed on Sep. 17, 2021.

(30) Foreign Application Priority Data

Sep. 29, 2020    (JP) .................................. 2020-163419

(51) Int. Cl.
*H04R 1/00*    (2006.01)
*G06F 3/02*    (2006.01)
(Continued)

(52) U.S. Cl.
CPC ............... *H04R 1/025* (2013.01); *G06F 3/02* (2013.01); *H02J 7/0045* (2013.01); *H04R 3/00* (2013.01)

(58) Field of Classification Search
CPC .. H04R 1/025; H04R 3/00; G06F 3/02; G06F 3/0202; G06F 1/26; G06F 3/0308;
(Continued)

(56) References Cited

U.S. PATENT DOCUMENTS

| | | |
|---|---|---|
| 9,799,203 B1 | 10/2017 | Fritz |
| 2004/0186387 A1 | 9/2004 | Kosuda et al. |

(Continued)

FOREIGN PATENT DOCUMENTS

| | | |
|---|---|---|
| JP | 2004-298606 | 10/2004 |
| JP | 2009-290600 | 12/2009 |

(Continued)

OTHER PUBLICATIONS

International Search Report w/English translation dated Dec. 7, 2021, for PCT/JP2021/034358, 5 pp.

(Continued)

*Primary Examiner* — Rasha S Al Aubaidi
(74) *Attorney, Agent, or Firm* — Nixon & Vanderhye PC

(57) ABSTRACT

A housing of an example of an electronic apparatus has a top surface and a bottom surface and has a flat shape, wherein a cross-sectional shape thereof on a reference plane perpendicular to the up-down direction is a circular shape. A rechargeable battery has a rectangular parallelepiped shape. The rechargeable battery is provided inside the housing so that a first long side is at an angle to a direction extending from a first position on the side surface portion at which the charging terminal is exposed toward a second position on the side surface portion that is opposite from the first position. The electronic apparatus includes at least one of a vibrator and a speaker provided at a position that is between the first long side of the rechargeable battery and a portion of the side surface portion opposing the first long side, on the reference plane.

21 Claims, 15 Drawing Sheets

(51) Int. Cl.
*H02J 7/00* (2006.01)
*H04R 1/02* (2006.01)
*H04R 3/00* (2006.01)

(58) Field of Classification Search
CPC .... G06F 3/0346; G06F 1/1671; G06F 3/0219; G06F 3/0231; H02J 7/0045; A63F 13/24
See application file for complete search history.

(56) References Cited

U.S. PATENT DOCUMENTS

| | | |
|---|---|---|
| 2007/0114855 A1 | 5/2007 | Chamura |
| 2010/0053464 A1 | 3/2010 | Otsuka |
| 2010/0245265 A1 | 9/2010 | Sato et al. |
| 2018/0159221 A1 | 6/2018 | Liou et al. |
| 2019/0358529 A1 | 11/2019 | Takei et al. |
| 2021/0376636 A1 | 12/2021 | Takami et al. |

FOREIGN PATENT DOCUMENTS

| | | |
|---|---|---|
| JP | 2010-62685 | 3/2010 |
| JP | 2010-239211 | 10/2010 |
| JP | 2018-98759 | 6/2018 |
| JP | 2019-074972 | 5/2019 |
| JP | 2019-202091 | 11/2019 |
| WO | 2008/111138 | 9/2008 |
| WO | 2020/174675 | 9/2020 |

OTHER PUBLICATIONS

U.S. Appl. No. 18/127,517, filed Mar. 28, 2023, Wakana Ohori.
U.S. Appl. No. 18/127,527, filed Mar. 28, 2023, Yoshitaka Tamura.

ELECTRONIC APPARATUS

CROSS REFERENCE TO RELATED APPLICATION

This application is a continuation of International Patent Application PCT/JP2021/34358 filed on Sep. 17, 2021, which designated the U.S. and claims priority to Japanese Patent Application No. 2020-163419, filed on Sep. 29, 2020, the entire contents of which are incorporated herein by reference.

FIELD

The present disclosure relates to an electronic apparatus.

BACKGROUND AND SUMMARY

There are conventional electronic apparatuses having a shape of which the length in a certain direction is shorter than the length in a direction perpendicular to the certain direction (e.g., a flat shape).

With electronic apparatuses of such a shape described above, there was room for improvement with respect to the arrangement of elements inside the apparatuses.

Thus, the present application discloses an electronic apparatus in which the arrangement of elements inside the apparatus is improved.

(1)

An example of an electronic apparatus described herein comprises a housing, a charging terminal, and, a rechargeable battery. The housing has a top surface and a bottom surface and has a flat shape of which a length in an up-down direction is shorter than a length in a direction perpendicular to the up-down direction, wherein a cross-sectional shape thereof on a reference plane perpendicular to the up-down direction is a circular shape. The charging terminal is exposed on a side surface portion of the housing between the top surface and the bottom surface. The rechargeable battery has a rectangular parallelepiped shape whose cross-sectional shape on the reference plane is a rectangular shape having a first long side and a first short side. The rechargeable battery is inside the housing so that on the reference plane, the first long side is at an angle to a direction extending from a first position on the side surface portion at which the charging terminal is exposed toward a second position on the side surface portion that is opposite from the first position. The electronic apparatus comprises at least one of a vibrator and a speaker at a position that intersects with the reference plane and that is between the first long side of the rechargeable battery and a portion of the side surface portion opposing the first long side, on the reference plane.

With configuration (1) described above, since the rechargeable battery, the vibrator and/or the speaker can be arranged at positions intersecting with the same plane (i.e., the reference plane), it is possible to improve the arrangement of elements inside the electronic apparatus.

(2)

The electronic apparatus may comprise the speaker at a position that intersects with the reference plane and that is between the first long side of the rechargeable battery and a portion of the side surface portion opposing the first long side, on the reference plane. The electronic apparatus may comprise the vibrator at a position that intersects with the reference plane and that is between a second long side, which is an opposite side of the first long side, and a portion of the side surface portion opposing the second long side, on the reference plane.

With configuration (2) described above, the speaker and the vibrator can be both arranged in the housing.

(3)

The electronic apparatus may further comprise a holder that covers at least a part of the rechargeable battery. The holder holds at least one of the vibrator and the speaker from above.

With configuration (3) described above, it is possible to reduce the number of components inside the housing.

(4)

The speaker and the vibrator may be arranged staggered from each other with respect to a direction extending from the first position toward the second position.

With configuration (4) described above, the speaker and the vibrator can be arranged so as not to interfere with the rechargeable battery.

(5)

On the reference plane, the first long side may be oriented in a direction that is in middle between a direction extending from the first position toward the second position and a direction at right angle with respect to said direction.

(6)

On the reference plane, opposite ends of the first long side may be close to or in contact with the housing.

With configuration (6) described above, it is possible to arrange the rechargeable battery while making efficient use of the space in the housing.

(7)

A depression may be formed on an inner wall of the housing at least one position close to or in contact with a corner of the rechargeable battery.

With configuration (7) described above, it is possible to reduce the size of the housing.

The housing may have at least one of following shapes: a shape where the top surface bulges in an upward direction and a shape where the bottom surface bulges in a downward direction.

With configuration (8) described above, for electronic apparatuses with restrictions on the space for arranging components inside the housing, it is possible to improve the arrangement of elements inside the electronic apparatus.

(9)

The housing may include: an upper housing having the top surface; and a lower housing having the bottom surface. One of the upper housing and the lower housing may include an engaging portion. The other one of the upper housing and the lower housing may include a receiving portion to which the engaging portion can engage.

With configuration (9) described above, the engaging portion and the receiving portion make it easier to secure the upper housing and the lower housing to each other.

(10)

One of the engaging portion and the receiving portion may be on a portion of an inner wall of the housing that opposes a surface of the rechargeable battery including the first short side.

With configuration (10) described above, it is possible to arrange components while making efficient use of the space inside the housing, and it is possible to reduce the size of the electronic apparatus.

(11)

The electronic apparatus may further comprise a first input section used for making an operation input by a user. The first input section may be provided at the second position.

With configuration (11) described above, it is possible to arrange the first input section on the side surface portion of the housing without interfering with the rechargeable battery.

(12)

The first input section may extend from the second position to a position that is between a second long side, which is an opposite side of the first long side, and a portion of the side surface portion opposing the second long side, on the reference plane.

With configuration (12) described above, the first input section can be arranged in the housing without interfering with the rechargeable battery, thereby making it possible to reduce the size of the electronic apparatus.

(13)

The first input section may include a keytop and a biasing portion. The keytop can be pressed in a press-down direction extending from an outer side of the housing toward an inner side of the housing. The biasing portion is on the inner side of the housing with respect to the keytop for biasing the keytop in an opposite direction to the press-down direction.

With configuration (13) described above, the biasing portion can be arranged in the housing without interfering with the rechargeable battery, thereby making it possible to reduce the size of the electronic apparatus.

(14)

At least two openings may be formed in the bottom surface on a side of the second position with respect to a center of gravity position of the electronic apparatus.

With configuration (14) described above, a strap can be attached to the electronic apparatus. The electronic apparatus can be in such an orientation that the user can easily operate the electronic apparatus while the electronic apparatus is suspended by the strap, and it is therefore possible to improve the usability of the electronic apparatus.

The electronic apparatus may further comprise a bottom forming portion. The bottom forming portion is on a far side of the two openings as the two openings are viewed from outside of the housing and that includes a first surface to be a bottom of the openings and a second surface facing in an opposite direction to the press-down direction. The biasing portion may bias the keytop in an opposite direction to the press-down direction by being sandwiched between the second surface and the keytop.

With configuration (15) described above, it is possible to reduce the number of components inside the housing.

(16)

The electronic apparatus may comprise the speaker at a position that intersects with the reference plane and that is between the first long side and a portion of the side surface portion opposing the first long side, on the reference plane. The speaker may be at an angle in a rotation direction around an axis that is oriented in a direction closer to the first long side than to the first short side.

With configuration (16) described above, it is possible to arrange the speaker while making efficient use of the space in the housing.

(17)

A sound hole may be formed in the side surface portion at a position near the speaker.

With configuration (17) described above, sound from the speaker is easily transmitted to the outside of the housing.

With the combination of configurations (11), (16) and (17), since the sound hole is arranged on the side closer to the user who holds the electronic apparatus, sound from the speaker can be more easily heard by the user.

(18)

The electronic apparatus may further comprise a second input section and a first substrate. The second input section is on the top surface. The first substrate is on the top surface side relative to the rechargeable battery inside the housing. An input detection section that converts an input made on the second input section into a signal is on the first substrate.

With configuration (18) described above, as the second input section and the input detection section for detecting an input on the second input section are arranged together on the upper side of the rechargeable battery, it is possible to make efficient use of the space in the housing.

(19)

The electronic apparatus may further comprise a second substrate on the bottom surface side relative to the rechargeable battery inside the housing.

With configuration (19) described above, it is possible to reduce the sizes of the first substrate and the second substrate, and it is possible to reduce the size of the electronic apparatus.

(20)

The electronic apparatus may be a portable apparatus such that the entire housing can be held by a user with one hand.

With configuration (20) described above, it is possible to improve the arrangement of elements inside the portable electronic apparatus.

(21)

Another example of an electronic apparatus described herein comprises: a housing, a rechargeable battery or a battery housing, and, a terminal. The housing has a top surface and a bottom surface and has a length in an up-down direction being shorter than a length in a direction perpendicular to the up-down direction. The housing has a circular shape as viewed from above. The rechargeable battery or a battery housing section is inside the housing and has a rectangular parallelepiped shape, which is a rectangular shape having a first long side and a first short side as viewed from above. The terminal is between the first long side and a portion of an outer circumference of the housing that opposes the first long side as viewed from above, wherein a part of the terminal is exposed. The electronic apparatus comprises at least one of a vibrator and a speaker provided between the first long side and a portion of an inner circumference of the housing that opposes the first long side as viewed from above or between a second long side, which is an opposite side of the first long side, and a portion of the inner circumference of the housing that opposes the second long side as viewed from above.

With configuration (21) described above, since the rechargeable battery, the vibrator and/or the speaker can be arranged without interference, it is possible to improve the arrangement of elements inside the electronic apparatus.

With the electronic apparatus described above, it is possible to improve the arrangement of elements inside the apparatus.

These and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

An electronic apparatus according to an example of the present embodiment will be described. The electronic apparatus of the present embodiment is a peripheral device related to an information processing device such as a smartphone. Note that the information processing device is not limited to a smartphone, but may be any type of information processing device, such as a portable or home-console video game device, a mobile telephone, a tablet device, a personal computer or a wearable device. An electronic apparatus is, for example, a portable electronic apparatus that is used in a situation where it is carried by the user together with a portable information processing device. The electronic apparatus communicates with the information processing device, for example, to transmit information indicating operations performed on the electronic apparatus to the information processing device, or to transmit information detected in the electronic apparatus to the information processing device. The electronic apparatus also notifies the user by vibrating, glowing, or outputting sound. For example, an electronic apparatus may notify in response to an operation performed on the electronic apparatus, in response to information detected by the electronic apparatus, or in response to an instruction from the information processing device. Note that while the present embodiment uses an electronic apparatus with functions as described above as an example, the electronic apparatus may have any function.

1. External Configuration of Electronic Apparatus

Figure 1:
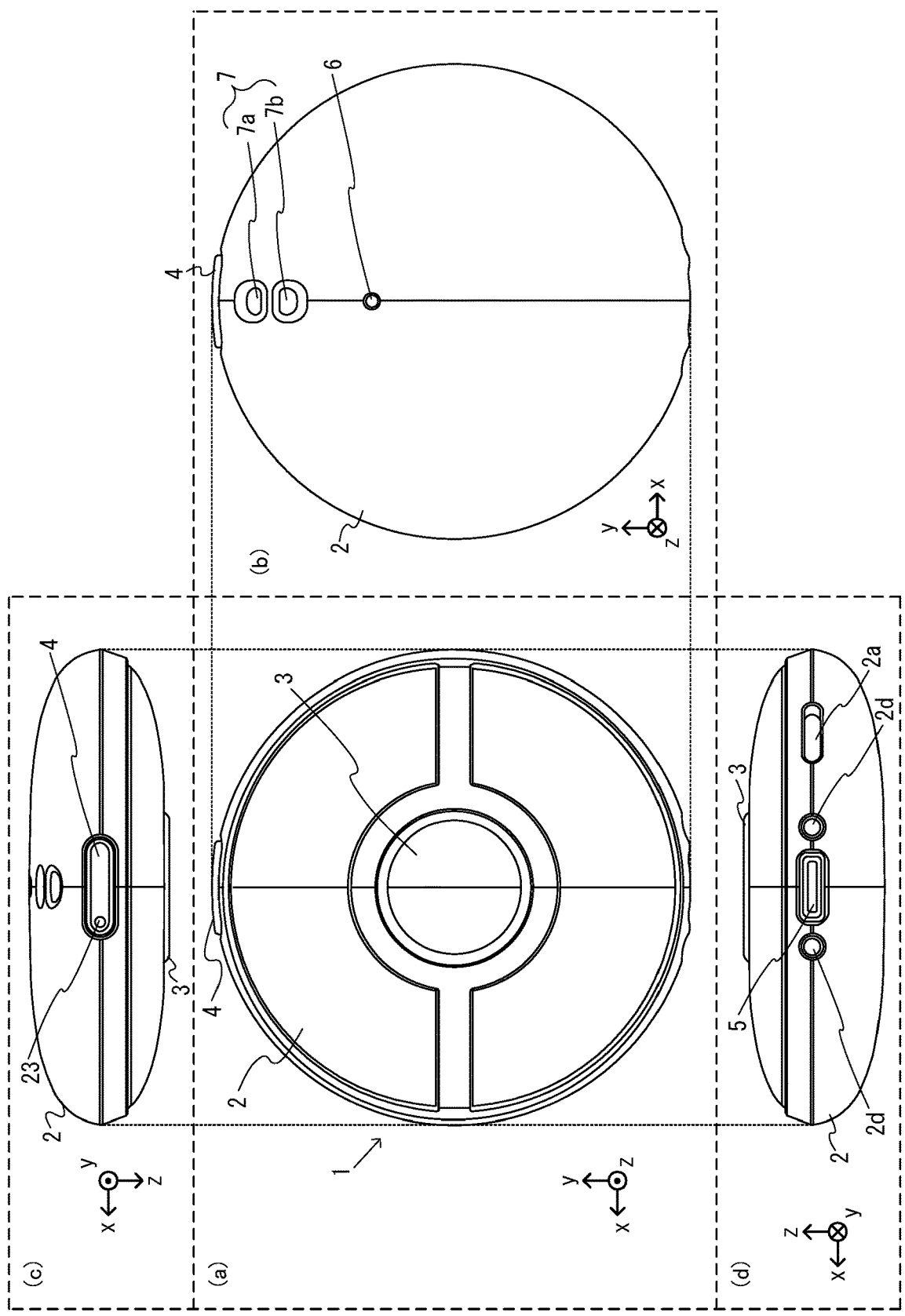
FIG. 1 is a four-sided view showing an example of a non-limiting electronic apparatus.

First, the external configuration of the electronic apparatus will be described. FIG. 1 is a four-sided view showing an example of the electronic apparatus. In FIG. 1, (a) is a plan view, (b) is a bottom view, (c) is a rear view, and (d) is a front view.

As shown in FIG. 1, the electronic apparatus 1 includes a housing 2. The housing 2 is shaped with a top surface and a bottom surface. Here, in the present embodiment, the direction extending from the bottom surface to the top surface (more specifically, from the center of the bottom surface to the center of the top surface) is the upward direction (i.e., the z-axis positive direction shown in FIG. 1) and the direction opposite to the upward direction is the downward direction (i.e., the z-axis negative direction shown in FIG. 1).

Figure 2:
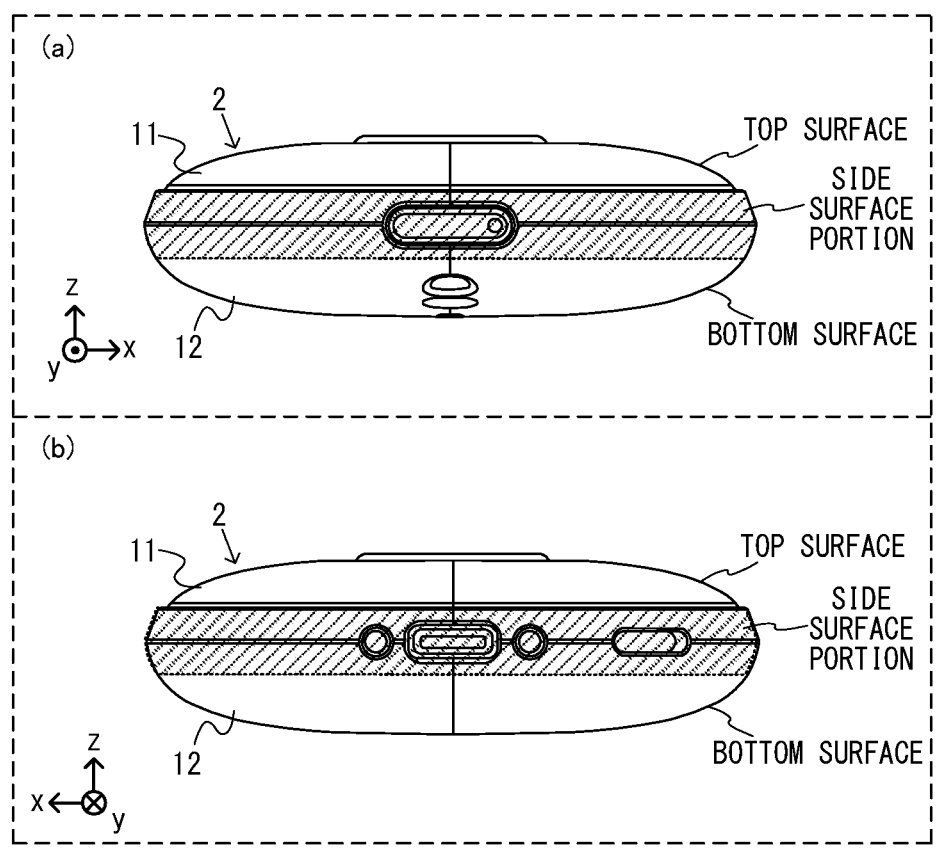
FIG. 2 is a view showing an example of various components of a non-limiting housing.

FIG. 2 is a view showing an example of various components of the housing 2. In FIG. 2, (a) is a rear view and (b) is a front view. As shown in FIG. 2, the housing 2 includes a side surface portion (hatched portion in FIG. 2) between the top surface and the bottom surface. Note that if the housing 2 does not have an edge that is to be the boundary between the top surface or the bottom surface and the side surface, the boundary between the top surface or the bottom surface and the side surface portion may be determined as follows, for example. That is, the boundary between the top surface and the side surface portion is a line that comprises positions at which the angle between the normal to the housing 2 and the upward direction becomes a predetermined first angle, wherein the portion of the housing where this angle is within a predetermined range equal to or greater than the first angle is the side surface portion. The boundary between the bottom surface and the side surface portion is a line that comprises positions at which the angle between the normal to the housing 2 and the downward direction becomes a predetermined second angle, wherein the portion where this angle is within a predetermined range equal to or greater than the second angle is the side surface portion. Note that the first angle and the second angle may be the same or may be different.

Note that a terminal 5 is provided on the side surface portion of the housing 2 (see FIG. 1). Here, in the present embodiment, a direction that is perpendicular to the up-down direction and extends from the center of the housing 2 to the terminal 5 is defined as the forward direction (i.e., the y-axis negative direction shown in FIG. 1), and the opposite direction to the forward direction is defined as the rearward direction (i.e., the y-axis positive direction shown in FIG. 1). That is, the terminal 5 is located at the front end of the housing 2. By defining the up-down direction and the front-rear direction as described above, the leftward direction (i.e., the x-axis positive direction shown in FIG. 1) and the rightward direction (i.e., the x-axis negative direction shown in FIG. 1), which are perpendicular to the up-down direction and perpendicular to the front-rear direction, are also defined.

In the present embodiment, the housing 2 includes an upper housing 11 and a lower housing 12 (see FIG. 2). In the present embodiment, the upper housing 11 includes the top surface described above, and the lower housing 12 includes the bottom surface and the side surface portion described above. That is, the boundary between the top surface and the side surfaces portion is the boundary between the upper housing 11 and the lower housing 12. Note that there is no limitation on the location of the boundary between the upper housing 11 and the lower housing 12 and, for example, in other embodiments, the upper housing may include part or whole of the side surface portion.

As shown in FIG. 1, the housing 2 has a circular shape as viewed from above. Here, a "circular shape" means a shape that appears generally circular in appearance. A circular shape means that it may be a perfect circular shape, or it may be a shape with portions lacking from a perfect circle and/or portions protruding from a perfect circle. A circular shape means that a part of the outer circumference may be a shape that is not a circular arc. A circular shape means that it may be a shape obtained by slightly distorting a perfect circle.

The housing 2 can also be said to be a shape formed by a curve bulging outward as viewed from above. For example, the housing 2 may have a shape that is an elliptical shape or an egg shape as viewed from above, in addition to a circular shape as described above (see "(Variation regarding shape of housing)" to be described below).

As shown in FIG. 1, the housing 2 has a shape of which the length in the up-down direction is shorter than the length in a direction perpendicular to the up-down direction. In the present embodiment, the housing 2 has a circular shape as viewed from above, and the housing 2 has a shape of which the length in the up-down direction is shorter than the length in any direction perpendicular to the up-down direction. In the present embodiment, the length of the housing 2 in the up-down direction (i.e., the thickness) is 21 [mm], and the length in the direction perpendicular to the up-down direction (i.e., the diameter of the circular shape as viewed from above) is 65 [mm]. Thus, the housing 2 of the present embodiment can be said to have a flat shape. For example, a shape of which the length in the up-down direction is less than half the length in the direction perpendicular to the up-down direction can be said to be a flat shape. Note that in other embodiments, the housing may have a shape that is not quite a flat shape, but of which the length in the up-down direction is shorter than the length in the direction perpendicular to the up-down direction.

In the present embodiment, the top surface of the housing 2 is bulging in the upward direction (see FIG. 1). More specifically, in the present embodiment, the top surface of the housing 2 has a cross-sectional shape, parallel to the up-down direction, that protrudes upward. The cross-sectional area of the inside of the housing 2 of the electronic apparatus 1 as cut along a plane perpendicular to the up-down direction becomes smaller as the plane moves upward from the position of the plane at which the cross-sectional area is at maximum. Note that a "shape bulging in the upward direction" is not limited to a shape as described above, but refers also to a shape in which a portion of the top surface other than the outer edge of the top surface is located on the upper side relative to the outer edge of the top surface. For example, if the top surface of a shape near the outer edge thereof protrudes upward and if the top surface near the center thereof is flat or depressed in the downward direction but is still located on the upper side relative to the outer edge of the top surface, the top surface of such a shape can be said to have a "shape bulging in the upward direction". Note that in other embodiments, the top surface of the housing does not have to have a shape bulging in the upward direction, and it may be a flat surface or a shape that is depressed in the downward direction, for example.

In the present embodiment, the bottom surface of the housing 2 has a shape bulging in the downward direction (see FIG. 1). That is, the bottom surface of the housing 2 has a cross-sectional shape parallel to the up-down direction that protrudes downward. The cross-sectional area of the inside of the housing 2 of the electronic apparatus 1 as cut along a plane perpendicular to the up-down direction becomes smaller as the plane moves downward from the position of the plane at which the cross-sectional area is at maximum.

Note that in other embodiments, the bottom surface of the housing may have a shape that is flat or depressed in the upward direction.

Figure 3:
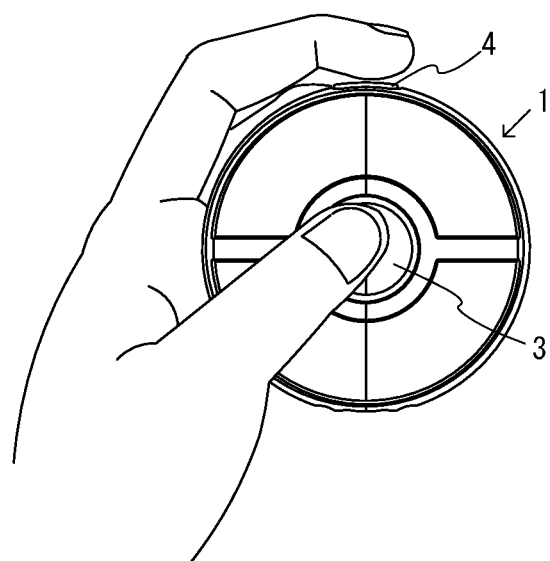
FIG. 3 is a view showing an example of how the user holds the non-limiting electronic apparatus.

FIG. 3 is a view showing an example of how the user holds the electronic apparatus 1. As shown in FIG. 3, in the present embodiment, the housing 2 is sized so that the user can hold the entire housing 2 with one hand. Thus, the electronic apparatus 1 of the present embodiment is a portable (or "carriable") apparatus that can be held by the user with one hand. For example, a housing of which the length in the left-right direction and the length in the front-rear direction are less than or equal to 100 [mm] can be said to be sized so that the user can hold the entire housing with one hand.

As shown in FIG. 1, the electronic apparatus 1 includes a top surface button 3. The top surface button 3 is an example of the input section where the user performs an operation input, and more specifically, it is a type of an input section that can be pressed by the user. The top surface button 3 is provided on the top surface of the housing 2. Specifically, a hole is formed in the top surface of the housing 2, and the top surface button 3 is provided so that a part of the top surface button 3 is exposed through the hole. Note that "a member is exposed" as used in the present specification means that the member (or a part thereof) is visible from the outside of the electronic apparatus 1. Note that a "member is exposed" means to include both an embodiment in which the member is provided to protrude from the housing and an embodiment in which the member is provided without protruding from the housing. Note that in the present specification, the surface of a portion of the top surface button 3 that is exposed through the hole is referred to as the "exposed surface". Note that in other embodiments, the top surface of the housing and the exposed surface of the top surface button may be formed integral using an elastic material, for example.

In the present embodiment, the hole described above has a circular shape and the exposed surface of the top surface button 3 has a circular shape. In the present embodiment, the exposed surface of the top surface button 3 is larger than the exposed surface of a side surface button 4 to be described below. In the present embodiment, the top surface button 3 is located in the center of the housing 2 as viewed from above. More specifically, the top surface button 3 is provided so that the center of the housing 2 and the center of the top surface button 3 are aligned (or close together) as viewed from above. The top surface button 3 is provided at the upper end of the housing 2. As shown in FIG. 1, where the top surface button 3 is not pressed, the top surface button 3 protrudes in the upward direction from the housing 2. As will be described in detail below, the top surface button 3 can move in the downward direction in response to the exposed surface being pressed in the downward direction.

In the present embodiment, the top surface button 3 is made of a light-transmissive material. Note that "light-transmissive material" means a material that is transmissive to light, and may be a transparent material (i.e., a material with which the shape of an object on the other side of the material can be clearly recognized) or a semi-transparent material (i.e., a material with which the shape of an object on the other side of the material cannot be clearly recognized). As will be described in detail below, a top surface light-emitting section (i.e., a top surface light-emitting section 42 shown in FIG. 4) is provided at a location on the inner side of the housing 2 relative to the top surface button 3. Light from the top surface light-emitting section is emitted through the top surface button 3, making it appear as if the top surface button 3 is glowing. Note that the detailed configuration of the top surface button 3 will be described below.

As shown in FIG. 1, the electronic apparatus 1 includes a side surface button 4. The side surface button 4 is an example of the input section where the user performs an operation input, and more specifically, it is a type of an input section that can be pressed by the user. The side surface button 4 is provided on the side surface portion of the housing 2. Specifically, a hole (i.e., a hole 2b shown in FIG. 8) is formed in the side surface portion of the housing 2, and the side surface button 4 is provided so that a part of the side surface button 4 is exposed through the hole. The hole described above has a horizontally elongate shape, and a portion of the side surface button 4 that is exposed from the housing 2 (i.e., the exposed surface) has a horizontally elongate shape (see FIG. 1). In the present embodiment, the side surface button 4 is located near the center of the housing 2 with respect to the up-down direction. As shown in FIG. 1, while the side surface button 4 is not pressed, the side surface button 4 protrudes in the rearward direction from the housing 2. As will be described in detail below, the side surface button 4 can move in the forward direction in response to the exposed surface being pressed in the forward direction.

As shown in FIG. 1, in the present embodiment, the side surface button 4 is provided at the rear end of the side surface portion of the housing 2. That is, the side surface button 4 and the terminal 5 are provided at locations that are in symmetry with each other with respect to the center of the housing 2 as viewed from above. Then, when the user holds the electronic apparatus 1 so as to operate the top surface button 3 and the side surface button 4 (see FIG. 3), the user's hand is less likely to cover the terminal, making it easier to hold the electronic apparatus 1 even when a cord, or the like, is connected to the terminal.

In the present embodiment, a hole is formed in the exposed surface of the side surface button 4, and a lightguide portion 23 to be described below is exposed through the hole (see FIG. 1). As will be described in detail below, in the present embodiment, a side surface light-emitting section (i.e., a side surface light-emitting section 224 shown in FIG. 15) is provided inside the housing 2, and light from the side surface light-emitting section is emitted through the lightguide portion 23, making it appear as if the lightguide portion 23 is glowing. Note that the detailed configuration of the side surface button 4 will be described below.

The terminal 5 is a terminal for electrically connecting the electronic apparatus 1 to other devices. In the present embodiment, the terminal 5 is a USB connector (more specifically, a USB type-C female connector). The terminal 5 may be used for the electronic apparatus 1 to receive power from other devices or for the electronic apparatus 1 to communicate with other devices. As will be described in detail below, in the present embodiment, the electronic apparatus 1 includes a rechargeable battery 27 (see FIG. 4), and the power supplied through the terminal 5 can be used to charge the rechargeable battery 27. Thus, the terminal 5 in the present embodiment can be called a charging terminal. Note that a charging terminal means a terminal such that charging can be done via the terminal, and does not mean to be limited to a terminal that can be used only for charging (e.g., a terminal that cannot be used for communication). Note that in other embodiments, the terminal may be usable only for charging.

The terminal 5 is provided on the side surface portion of the housing 2 (see FIG. 1). Specifically, a hole is formed at the front end position on the side surface portion of the housing 2, and the terminal 5 is provided so that a part of the terminal 5 (e.g., a portion including the pin) is exposed from the housing 2. Note that the terminal 5 does not protrude from the housing 2, but is provided on the inner side of the housing 2 relative to the opening of the hole described above.

In the present embodiment, the electronic apparatus 1 includes a bottom surface button 6. The bottom surface button 6 is an example of the input section where the user performs an operation input, and more specifically, it is a type of an input section that can be pressed by the user. As shown in FIG. 1, the bottom surface button 6 is provided on the bottom surface of the housing 2. Specifically, a hole is formed in the bottom of the housing 2, and the bottom surface button 6 is provided so that a part thereof is exposed from the housing 2. In the present embodiment, the bottom surface button 6 functions as a so-called reset button. For example, the bottom surface button 6 is for accepting an instruction to redo the setting process (e.g., pairing) for the communication connection between the electronic apparatus 1 and another device that performs wireless communication with the electronic apparatus 1. Therefore, in order to reduce the possibility that the user may inadvertently press the bottom surface button 6, the exposed portion (i.e., the exposed surface) of the bottom surface button 6 is provided in a recessed position (i.e., so as not to protrude) relative to the bottom surface of the housing 2 (see FIG. 1). The area of the exposed surface of the bottom surface button 6 is smaller than the area of the exposed surface of the top surface button and the area of the exposed surface of the side surface button.

In the present embodiment, a strap hole 7 is formed in the housing 2. As shown in FIG. 1, the strap hole 7 is formed on the bottom surface of the housing 2. The strap hole 7 is in such a form that two openings 7a and 7b formed in the bottom surface of the housing 2 are connected together by a wall inside the housing 2. A strap can be attached to the electronic apparatus 1 by passing the strap through the two openings and tying the strap.

In the present embodiment, the strap hole 7 (i.e., the two openings 7a and 7b) is formed on the side of the rear end position (i.e., the rear side) of the housing 2 with respect to the center of gravity position of the electronic apparatus 1 (here, it is assumed to be a position near the center of the housing 2) (see FIG. 1). Then, where the user holds the strap attached to the electronic apparatus 1 (i.e., where the electronic apparatus 1 is suspended), the electronic apparatus 1 is in an attitude such that the side surface button 4 is on the upper side and the terminal 5 is on the lower side. Here, it is assumed that the electronic apparatus 1 of the present embodiment is held in such a way that the user operates the top surface button 3 with the thumb and the side surface button 4 with the index finger (see FIG. 3). Therefore, when the electronic apparatus 1 is in such an attitude as described above, the user can hold the electronic apparatus 1 in such a way that it is easy to perform operations by holding the electronic apparatus 1 as it is (i.e., without changing its attitude) in the suspended state. Thus, it is possible to improve the usability of the electronic apparatus 1.

Note that in other embodiments, the strap hole may be formed at any location. For example, in other embodiments, the strap hole may be formed in the side surface portion of the housing. Note that even where the strap hole is formed in the side surface portion, similar effects to those of the present embodiment can be achieved if the strap hole is formed on the side of the rear end position of the housing 2 with respect to the center of gravity position of the electronic apparatus 1. In other embodiments, the strap hole may be absent.

In the present embodiment, a sound hole 2a is formed in the housing 2. As shown in FIG. 1, the sound hole 2a is formed in the side surface portion of the housing 2. As will be described in detail below, a speaker is provided inside the housing 2, and the sound hole 2a is formed at a position near the speaker. In the present embodiment, the sound hole 2a is formed at a position on the front side relative to the center of the housing 2 (see FIG. 1).

2. Internal Configuration of Electronic Apparatus 1

Figure 4:
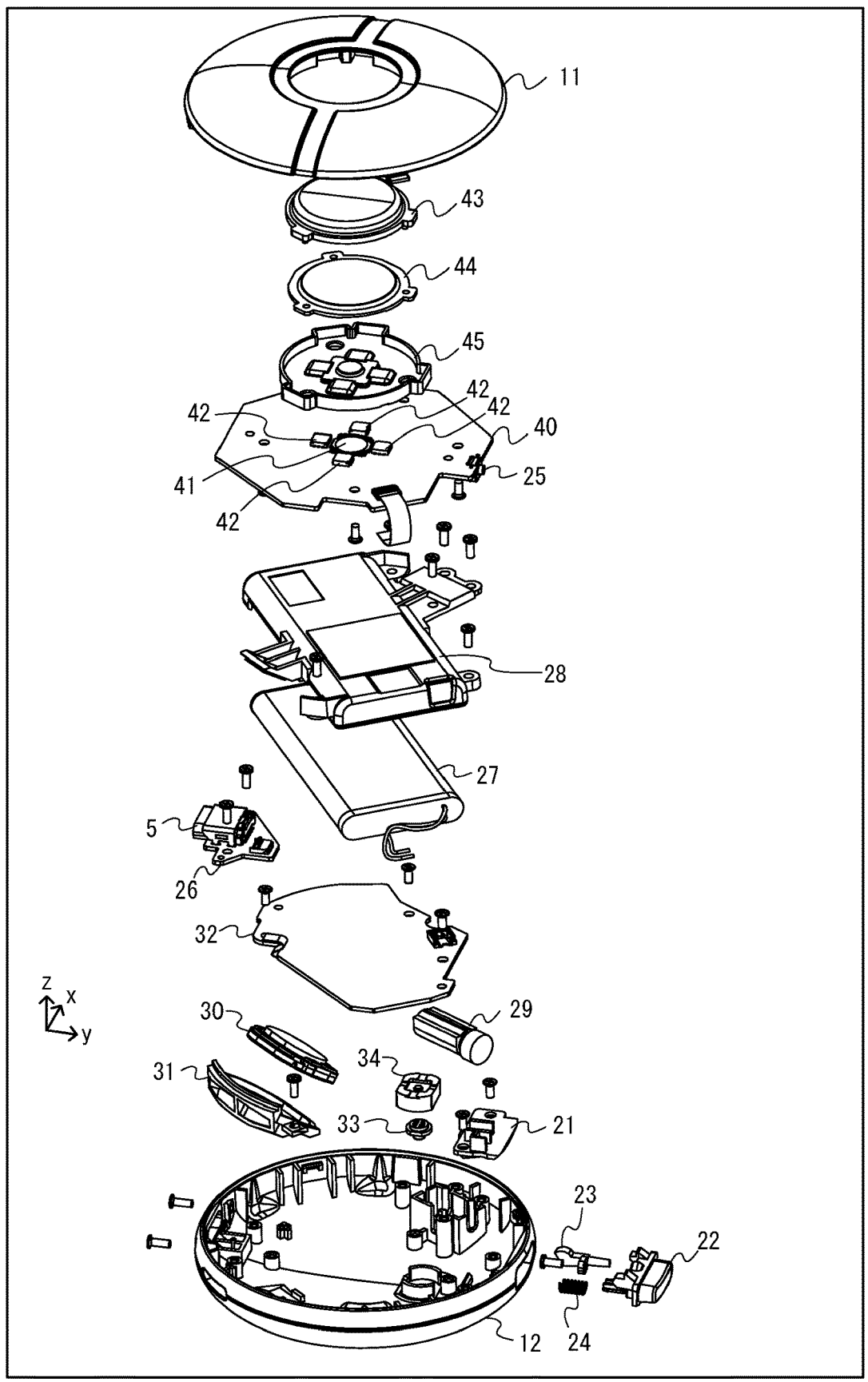
FIG. 4 is an exploded perspective view showing an example of the internal configuration of the non-limiting electronic apparatus.
Figure 5:
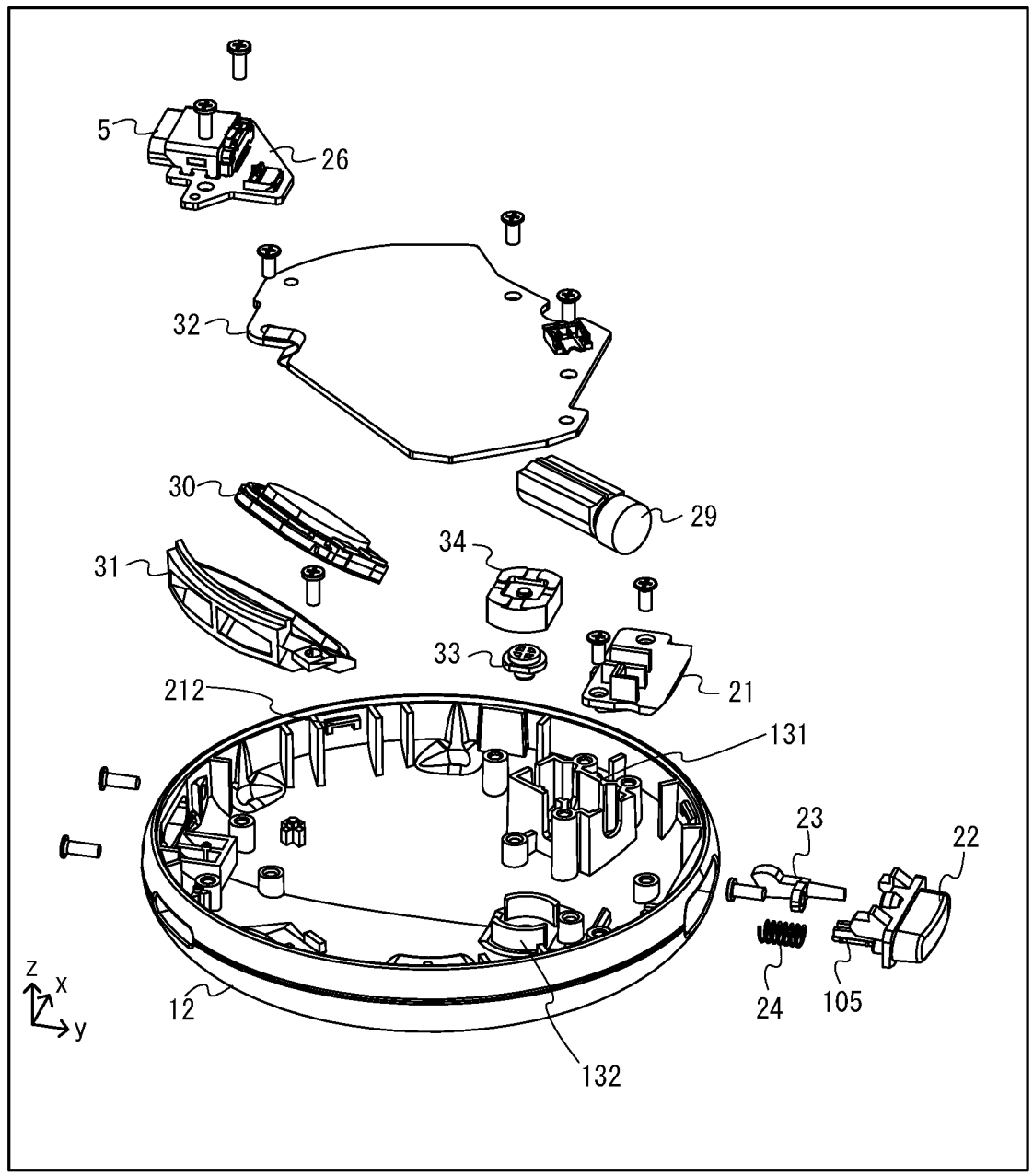
FIG. 5 is an exploded perspective view showing a part of FIG. 4 on an enlarged scale.
Figure 6:
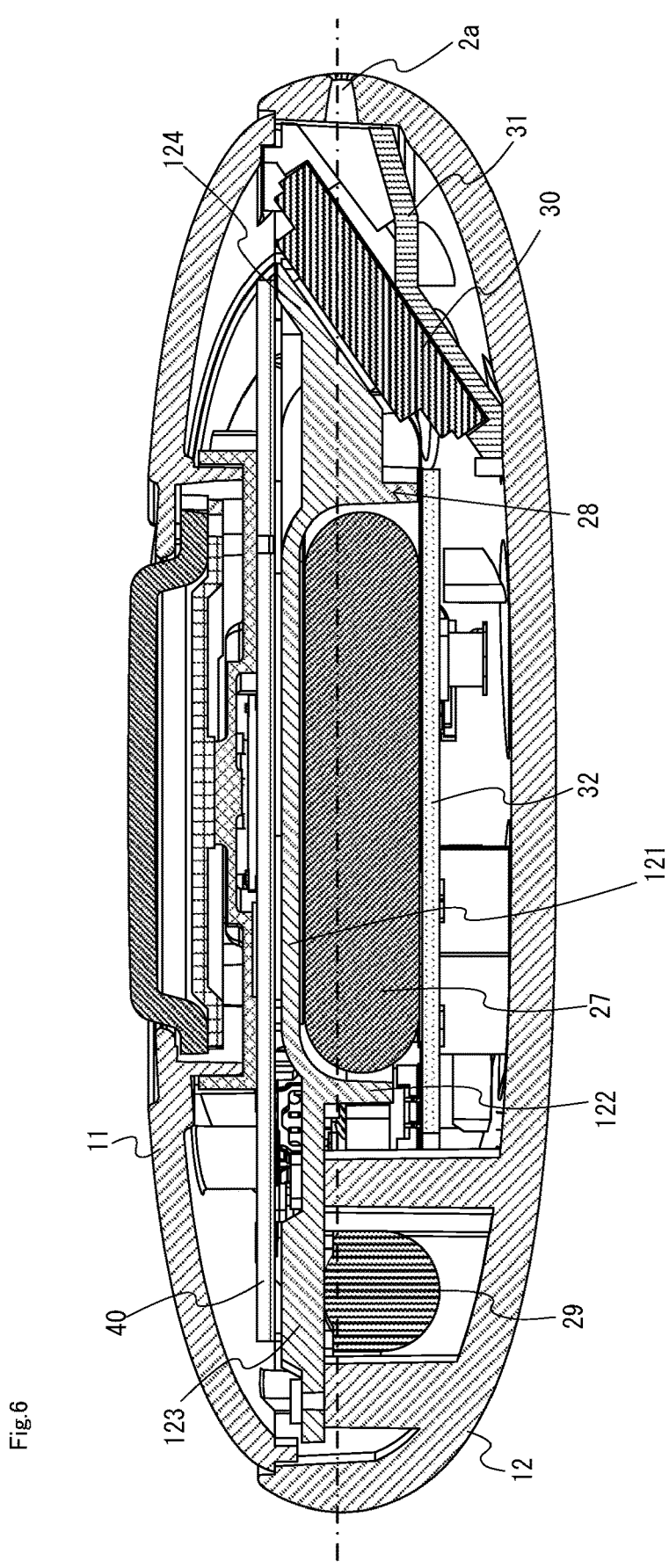
FIG. 6 is a cross-sectional view showing an example of the internal configuration of the non-limiting electronic apparatus.
Figure 7:
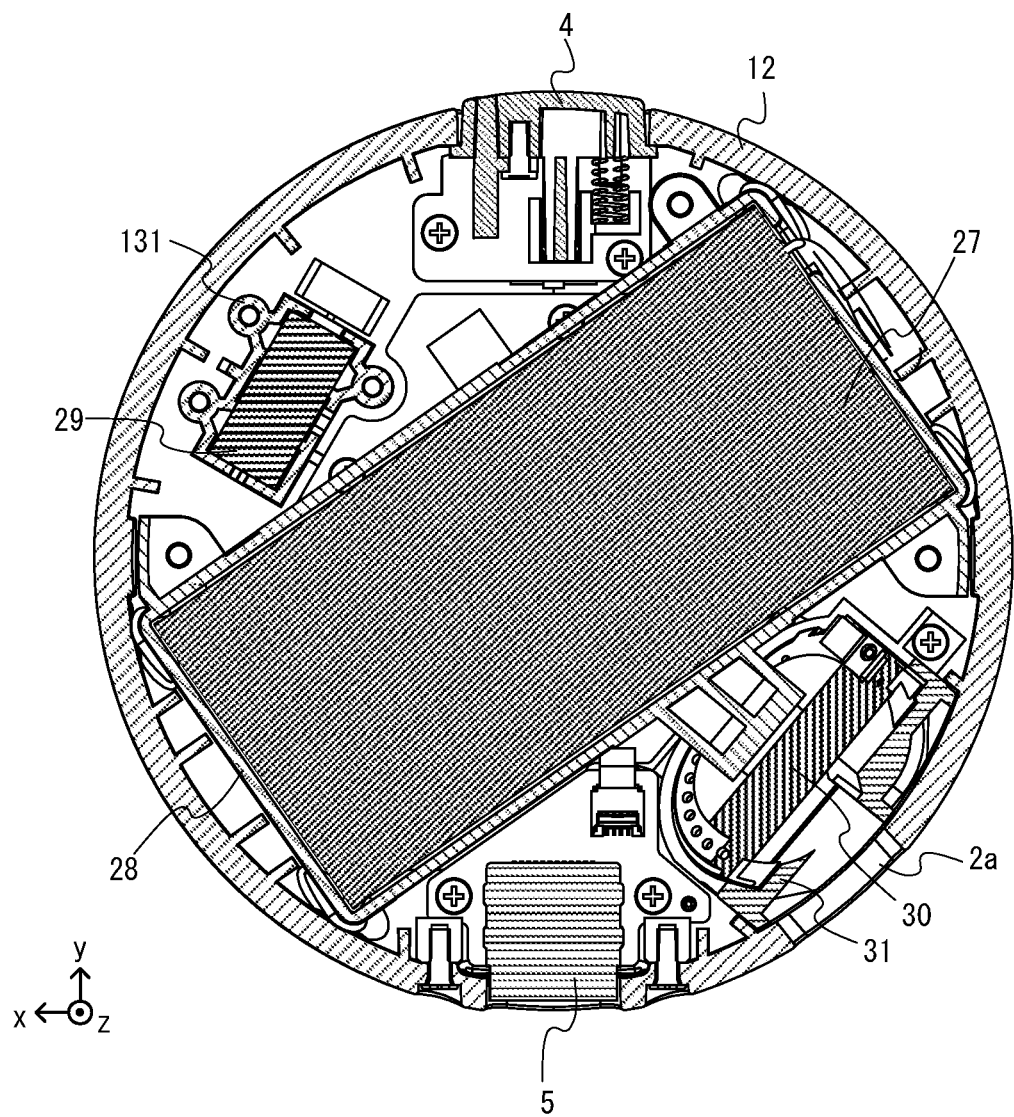
FIG. 7 is a cross-sectional view showing an example of the internal configuration of the non-limiting electronic apparatus.

Next, the internal configuration of the electronic apparatus 1 will be described. FIG. 4 is an exploded perspective view showing an example of the internal configuration of the electronic apparatus 1. FIG. 5 is an exploded perspective view showing a part of FIG. 4 on an enlarged scale, showing those of the internal elements shown in FIG. 4 that are provided on the lower side relative to the rechargeable battery 27. FIG. 6 and FIG. 7 are cross-sectional views showing an example of the internal configuration of the electronic apparatus 1. Note that the cross-sectional view shown in FIG. 6 shows a cross section that is parallel to the up-down direction and passes through the center of the housing 2 and the position of the sound hole 2a. FIG. 7 is a cross-sectional view showing a cross section on the reference plane as viewed from above.

Herein, the reference plane is one of the planes that are perpendicular to the up-down direction and intersect with the rechargeable battery of the electronic apparatus 1. In the present embodiment, the reference plane is one of the planes that are perpendicular to the up-down direction and intersect with the rechargeable battery 27 of the electronic apparatus 1, for which the cross-sectional area of the internal space of the housing 2 along the plane is largest (see one-dot chain line in FIG. 6). Note that the cross-sectional area refers to the cross-sectional area of the internal space of the housing 2 when no components are arranged inside the housing 2, and that is not affected by the presence/absence of components inside the housing 2. The reference plane is defined for the purpose of describing the arrangement of components of the electronic apparatus 1, and is not an actual component of the electronic apparatus 1. It is not necessary that any component be arranged along the entire reference plane.

Note that the reference plane is not limited to a plane for which the cross-sectional area is largest as described above, but may be any plane that is perpendicular to the up-down direction and intersects with the rechargeable battery. For example, while the reference plane intersects with the side surface portion of the housing in the present embodiment, the reference plane does not need to intersect with the side surface portion in other embodiments. If, in other embodiments, the plane for which the cross-sectional area described above is largest does not intersect with the rechargeable battery, the reference plane may be a different plane than the plane for which the cross-sectional area is largest. Even if the plane for which the cross-sectional area described above is largest intersects with the rechargeable battery, the reference plane may be a plane different from the plane for which the cross-sectional area is largest.

(Side Surface Button)

Figure 8:
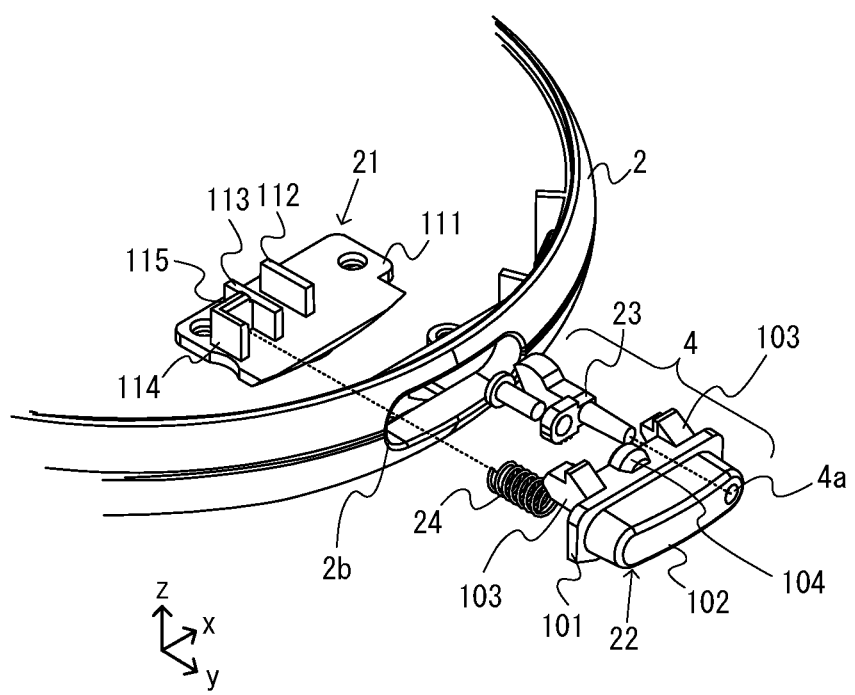
FIG. 8 is an exploded perspective view of an example of a non-limiting side surface button.

First, the side surface button 4 described above will be described. A part of the side surface button 4 is provided outside the housing 2 and another portion thereof is provided inside the housing 2. FIG. 8 is an exploded perspective view of the side surface button 4. Note that in FIG. 8, a part of the housing 2 and a guide portion 21 are shown in addition to the side surface button 4. As shown in FIG. 4, FIG. 5 and FIG. 8, the side surface button 4 includes a side surface keytop 22, the lightguide portion 23 and a biasing portion 24.

The side surface keytop 22 includes a plate-shaped portion 101, a button portion 102, a stopper 103, a protruding portion 104 and a shaft portion 105. The plate-shaped portion 101 has a shape of a plate provided parallel to a plane perpendicular to the front-rear direction (i.e., the xz plane in FIG. 8). Note that the plate-shaped portion 101 is arranged inside the housing 2, and the size of the plate-shaped portion 101 as viewed from the front-rear direction is larger than the hole 2b provided in the side surface portion of the housing 2 as viewed from the front-rear direction. The button portion 102 is provided so as to protrude from the rear surface of the plate-shaped portion 101 in the rearward direction through the hole 2b. The rear side surface of the button portion 102 is the exposed surface described above. While the side surface button 4 is not pressed, the rear surface of the plate-shaped portion 101 contacts the inside of the housing 2 and the button portion 102 protrudes through the hole.

The stopper 103 is provided so as to protrude in the forward direction from the front surface of the plate-shaped portion 101. In the present embodiment, the side surface keytop 22 includes two stoppers 103, wherein one stopper 103 is provided in the upper right portion of the front surface of the plate-shaped portion 101 and the other stopper 103 is provided in the upper left portion of the front surface of the plate-shaped portion 101. Each stopper 103 includes a protruding portion protruding in the upward direction at a position rearward of the front end of the stopper 103. Where the side surface button 4 is pressed by a predetermined amount from the state where the side surface button 4 not pressed, the protruding portion of each stopper 103 contacts an upper substrate 40 to be described below (specifically, the rear side portion of the upper substrate 40). This prevents the side surface keytop 22 from moving forward beyond the state where the stoppers 103 contact the upper substrate 40. Thus, the stoppers 103 can prevent an excessive load from being applied to a side surface input detection section 25 to be described below when the side surface button 4 is pressed. By providing two, left and right stoppers 103 in the present embodiment, at least one of the protruding portions of the stoppers 103 contacts the upper substrate 40 even when either the right side or the left side of the side surface button 4 is pressed. This more reliably prevents an excessive load from being applied to the side surface input detection section 25.

The shaft portion 105 is provided near the central portion with respect to the left-right direction (which can be said to be the position between the two stoppers 103) on the front surface of the plate-shaped portion 101. The shaft portion 105 is provided as to protrude in the forward direction from the front surface (see FIG. 5). The protruding portion 104 is provided above the shaft portion 105 so as to protrude in the forward direction from the front surface of the plate-shaped portion 101.

The electronic apparatus 1 includes the guide portion 21 inside the housing 2. The guide portion 21 is provided forward of the side surface keytop 22 and is secured to the lower housing 12 by screwing, for example. The guide portion 21 includes a bottom portion 111 parallel to the horizontal direction (i.e., a direction perpendicular to the up-down direction) and wall portions 112 to 115 extending vertically in the upward direction from the bottom portion 111. In the present embodiment, the upper surface of the bottom portion 111 is in contact with the lower end of the shaft portion 105. A part of the stopper 103 (specifically, a portion forward of the protruding portion) contacts the lower surface of the upper substrate 40. Thus, the movement of the side surface keytop 22 in the up-down direction is restricted by the guide portion 21 and the upper substrate 40. Two wall portions 112 and 113 of the wall portions 112 to 115 are provided on both the left and right sides of the shaft portion 105 of the side surface keytop 22 so as to extend in the front-rear direction along the shaft portion 105. That is, the shaft 105 is inserted between these two wall portions 112 and 113. This restricts the movement of the side surface keytops 22 in the left-right direction. Thus, the side surface keytop 22 is configured to be movable in the front-rear direction while its movement in the up-down direction and the left-right direction is regulated.

The biasing portion 24 is provided so as to extend in the front-rear direction, with the rear end of the biasing portion 24 in contact with the front surface of the plate-shaped portion 101 of the side surface keytop 22, directly under one of the stoppers 103 (herein, the right stopper 103). Note that while the biasing portion 24 is a spring (more specifically, a coil spring) in the present embodiment, it may be of any material having elasticity. A shaft is provided on the front surface of the plate section 101, extending in the forward direction from the front surface. The biasing portion 24 is arranged with the shaft described above inserted inside the coil spring. Two of the four wall portions 112 to 115 described above of the guide portion 21, i.e., the wall portions 113 and 114, are provided both on the left side and the right side of the biasing portion 24 so as to extend in the front-rear direction along the biasing portion 24. Thus, the biasing portion 24 is positioned with respect to the left-right direction by the shaft described above and the two wall portions 113 and 114, and is positioned with respect to the up-down direction by the shaft described above, the bottom portion 111 and the stoppers 103. Of the four wall portions 112 to 115, the wall portion 115 extending in the left-right direction is provided so as to be in contact with the front end of the biasing portion 24 (see the dotted line shown in FIG. 8). Thus, the biasing portion 24 biases the plate-shaped portion 101 in the rearward direction (i.e., the y-axis positive direction shown in FIG. 8; it can also be said to be the direction extending from the inner side toward the outer side of the housing 2). Therefore, the side surface keytop 22 is most protruding from the housing 2 by being biased in the rearward direction when the side surface button 4 is not pressed, and is movable in the forward direction when the side surface button 4 is pressed.

As described above, the side surface button 4, which is an example of the input section, includes a keytop (i.e., the side surface keytop 22) that can be pressed from the outside of the housing 2 to the inside of the housing 2 in a pressing direction (e.g., the forward direction), and the biasing portion 24 provided on the inner side of the housing 2 relative to the keytop so as to bias the keytop in the opposite direction to the press-down direction. Thus, in the present embodiment, the side surface button 4 is configured to apply a force to push back the keytop that is being pressed inside the housing 2.

The electronic apparatus 1 includes the side surface input detection section 25 that detects the pressing of the side surface button 4 inside the housing 2 (see FIG. 4). The side surface input detection section 25 is an electronic component (e.g., a switch) that converts an input (specifically, a press-down input) made on the side surface button 4 into a signal. The side surface input detection section 25 is provided forward of the protruding portion 104 of the side surface keytop 22. In the present embodiment, the side surface input detection section 25 is provided on the upper substrate 40, which will be described below. When the side surface button 4 is pressed, the protruding portion 104 moves in the forward direction, resulting in the pressing of the side surface input detection section 25. The side surface input detection section 25 detects the pressing of the side surface button 4 by detecting being pressed by the protruding portion 104.

In the present embodiment, the guide portion 21 is provided above (more specifically, directly above) the strap hole 7 described above. That is, the bottom portion 111 of the guide portion 21 is provided on the far side of the two openings 7a and 7b as the two openings 7a and 7b are viewed from the outside of the housing 2, and the lower surface of the bottom portion 111 is the bottom of the openings. That is, in the present embodiment, the guide portion 21 can be said to be the bottom forming portion that forms the bottom of the openings. When the user inserts the strap string into one of the openings 7a and 7b, the string hits the bottom forming portion to be guided to the other one of the openings 7a and 7b, thus making it easier for the user to take out the strap from the other one of the openings 7a and 7b and to attach the strap to the electronic apparatus 1. Note that in other embodiments, the bottom of the opening may be formed by the housing instead of being formed by the bottom forming portion (i.e., the guide portion 21).

Note that "a first component being provided above a second component" means that the first component is located on the upper side of the second component, and is arranged at a position such that at least a part of the first component appears to overlap with at least a part of the second component as viewed from above. A "first component being provided above a second component" does not mean a limitation that the first component is arranged so that the entirety of the first component overlaps with the second component as viewed from above. A "first component being provided directly above a second component" means that the first component is provided above the second component with no other components provided between the first component and the second component.

As described above, the guide portion 21 has a surface (specifically, the rear surface of the wall portion 115) facing the opposite side of the press-down direction, and the biasing portion 24 biases the side surface keytop 22 in the opposite direction to the press-down direction by being sandwiched between the surface and the side surface keytop 22. That is, the guide portion 21 has the function of holding down the biasing portion 24 in addition to functioning as the bottom of the strap hole 7. Thus, by providing the guide portion 21 with multiple functions, the number of components inside the housing 2 can be reduced, thereby saving the space in the housing 2 and making it easier to manufacture the electronic apparatus 1.

The lightguide portion 23 is a component for guiding light from the side surface light-emitting section inside the housing 2 (i.e., the side surface light-emitting section 224 shown in FIG. 15) to the outside of the housing 2. The lightguide portion 23 is made of a light-transmissive material (more specifically, a transparent material). As shown in FIG. 8, the lightguide portion 23 is shaped to extend in the front-rear direction and is provided so that the rear end surface is exposed through a hole 4a on the exposed surface of the button portion 102 (see dotted line in FIG. 8). Note that the lightguide portion 23 is secured to the side surface keytop 22 by screwing, for example. In the present embodiment, a side surface light-emitting section is provided on the upper substrate 40 to be described below, and the front end surface of the lightguide portion 23 is provided so as to be located near the side surface light-emitting section. When the side surface light-emitting section emits light, the light is incident on the front end surface of the lightguide portion 23, passes through the inside of the lightguide portion 23, and is emitted from the rear end surface. This allows the rear end surface of the lightguide portion 23 provided on the exposed surface to glow.

(Terminal 5)

Figure 9:
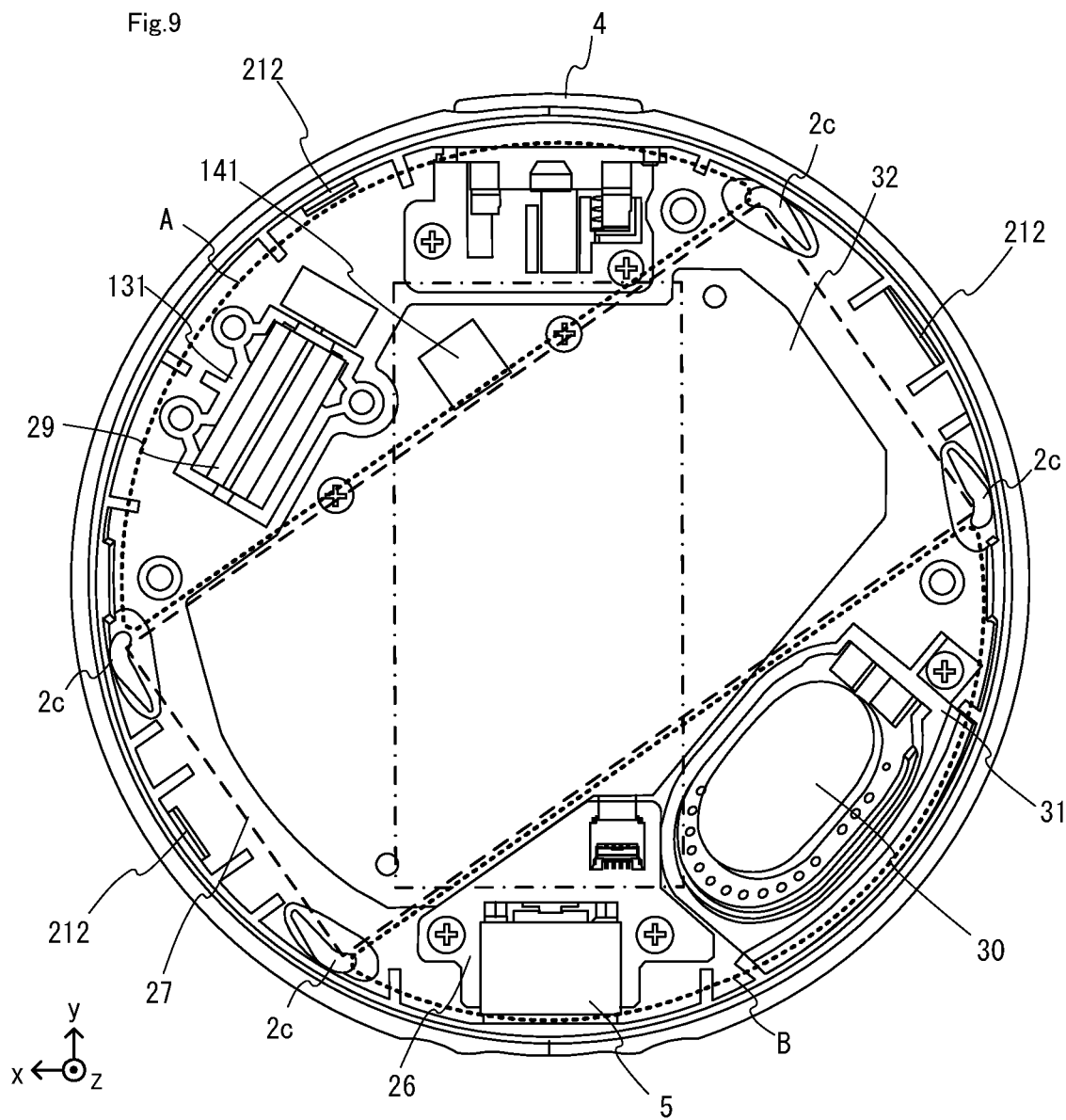
FIG. 9 is a view showing an example of the internal configuration of the non-limiting electronic apparatus.

Next, the terminal 5 described above will be described. FIG. 9 is a view showing an example of the internal configuration of the electronic apparatus 1. FIG. 9 shows the components arranged inside the housing 2, excluding the upper substrate 40 to be described below and components arranged on the upper side thereof and a holder 28 (see FIG. 4) to be described below. In FIG. 9, however, the location of the rechargeable battery 27 is indicated by a broken line. In FIG. 9, for the purpose of making it easier to see the arrangement of the components, only a portion of the housing 2 on the lower side relative to the reference plane is shown.

The electronic apparatus 1 includes a terminal substrate 26 which is secured to the terminal 5 inside the housing 2 (see FIG. 5 and FIG. 9). In the present embodiment, the lower surface of the terminal 5 is secured by bonding to the upper surface of the terminal substrate 26. Therefore, the terminal substrate 26 is provided below the terminal 5. The terminal substrate 26 is secured to the lower housing 12 by screwing, for example. Note that although not shown, the terminal 5 is electrically connected to the lower substrate 32 to be described below via the terminal substrate 26.

In the present embodiment, the terminal 5 is provided at a position that overlaps with the rechargeable battery 27 as viewed from a direction perpendicular to the up-down direction (i.e., the horizontal direction). This allows the length of the housing 2 with respect to the up-down direction to be shortened, and it is possible to reduce the thickness of the housing 2. Note that "provided at a position that overlap with" means that at least a part of the terminal 5 and at least a part of the rechargeable battery 27 overlap with each other, and is not limited to entirety of the terminal 5 overlapping with the rechargeable battery 27 or the entirety of the rechargeable battery 27 overlapping with the terminal 5.

(Rechargeable Battery)

As shown in FIG. 4, the electronic apparatus 1 includes the rechargeable battery 27. In the present embodiment, the rechargeable battery 27 is provided near the center of the housing 2. Specifically, the rechargeable battery 27 is provided so as to overlap with the center position of the housing 2 (see FIG. 6). Note that the terminal 5 and the side surface button 4 are provided on the side of the rechargeable battery 27.

In the present embodiment, the rechargeable battery 27 has a rectangular shape (see FIG. 4). Specifically, the rechargeable battery 27 has a shape of a rectangular parallelepiped with some edges thereof rounded off. The top surface of the rechargeable battery 27 is perpendicular to the up-down direction. This allows the length of the housing 2 in the up-down direction to be reduced, and it is possible to reduce the thickness of the electronic apparatus 1.

Note that in the present specification, an axis that passes through the center of the rechargeable battery 27 and that is parallel to the longer one of the sides parallel to the horizontal plane is called the "major axis of the rechargeable battery", and an axis that passes through the center and that is parallel to the shorter one of the sides parallel to the horizontal plane is called the "minor axis of the rechargeable battery". The rechargeable battery 27 has a rectangular shape on the reference plane (it can also be said that the cross-sectional shape on the reference plane is a rectangular shape; see FIG. 7). In the present specification, the longer ones of the four sides of the rechargeable battery 27 on the reference plane may be called the "long sides of the rechargeable battery" and the shorter sides may be called the "short sides of the rechargeable battery". A "long side of the rechargeable battery" and a "short side of the rechargeable battery" may be a straight line on a face (specifically, a side surface) of a rectangular parallelepiped, as well as being a side of a rectangular parallelepiped. Furthermore, in the present specification, the front long side of the long sides of the rechargeable battery 27 on the reference plane may be referred to as the "first long side" and the rear long side as the "second long side".

In the present embodiment, the rechargeable battery 27 has a flat shape (see FIG. 4 and FIG. 6). In the present embodiment, the rechargeable battery 27 is arranged in an orientation in which the surface with the largest area is the top surface (and the bottom surface). That is, the rechargeable battery 27 is arranged in an orientation in which the length in the up-down direction is shorter than the length in the direction perpendicular to the up-down direction as with the housing 2. Thus, it is possible to arrange the rechargeable battery 27 while making efficient use of the space in the housing 2, and to reduce the thickness of the electronic apparatus 1 as compared with a case where the rechargeable battery 27 is arranged in other orientations.

As shown in FIG. 9, in the present embodiment, the rechargeable battery 27 is arranged so that the long axis is at an angle to the front-rear direction. As shown in FIG. 7, on the reference plane, the long axis of the rechargeable battery 27 is at an angle to the front-rear direction (specifically, it is oriented in the middle direction between the front-rear direction and the left-right direction).

Here, in the present embodiment, the side surface button 4 is provided at the rear end position of the housing 2. On the reference plane, the side surface button 4 (e.g., the shaft portion 105 of the side surface button 4) extends from the rear end position to a position between the second long side of the rechargeable battery 27 and a portion of the side surface portion of the housing 2 that opposes the second long side (see FIG. 7). The rechargeable battery 27 is arranged at an angle to the front-rear direction as described above so as not to interfere with the side surface button 4 (it can also be said that it is arranged so as not to overlap as viewed from above). While the side surface button 4 includes components (e.g., the biasing portion 24 and the shaft portion 105) that are arranged inside the housing 2, these components can be arranged without interfering with the rechargeable battery 27 in the present embodiment. Thus, it is possible to reduce the size of the electronic apparatus 1.

It can also be said that the side surface button 4 is provided on the side surface portion of the housing 2 at a position overlapping with the rechargeable battery 27 as viewed from a direction perpendicular to the up-down direction. Note that in other embodiments, the side surface button may be provided at a position that overlaps with the rechargeable battery as viewed from a direction perpendicular to the up-down direction and that does not intersect with the reference plane. By arranging the side surface button 4 and the rechargeable battery 27 at the same height as described above, it is possible to reduce the thickness of the electronic apparatus 1.

In the present embodiment, the terminal 5 is provided at the front end position of the housing 2. On the reference plane, the terminal 5 extends from the front end position of the housing 2 to a position between the first long side of the rechargeable battery 27 and a portion of the side surface portion of the housing 2 that opposes the first long side (see FIG. 7). The terminal 5 is provided at a position on the side surface portion of the housing 2 that overlaps with the rechargeable battery 27 as viewed from a direction perpendicular to the up-down direction. The rechargeable battery 27 is arranged at an angle to the front-rear direction as described above so that it does not interfere with the terminal 5.

If the rechargeable battery 27 were arranged so that the long axis is parallel to the front-rear direction, the length of the long axis of the rechargeable battery 27 is set to be shorter than in the present embodiment (or increase the size of the housing 2) so as to prevent the rechargeable battery 27 from interfering with the terminal 5 and the side surface button 4. Note that the one-dot-chain line shown in FIG. 9 shows an example of the position of the rechargeable battery 27 where the rechargeable battery 27 is arranged so that the long axis is parallel to the front-rear direction and so as not to interfere with the terminal 5 and the side surface button 4. When the rechargeable battery 27 is arranged so that the long axis is oriented in the front-rear direction, only a smaller rechargeable battery 27 than that of the present embodiment (the dotted line shown in FIG. 9) can be arranged (or it is not possible to reduce the size of the housing 2). In contrast, in the present embodiment, the rechargeable battery 27 can be arranged at a position closer to the inner wall of the housing 2 by arranging the rechargeable battery 27 so that the long axis of the rechargeable battery 27 is at an angle to the front-rear direction as described above, thereby making it easier to arrange a larger rechargeable battery 27.

Note that in the present embodiment, it can also be said that by arranging the rechargeable battery 27 at an angle to the front-rear direction as described above, it is easier to secure a space for arranging the terminal 5 and the side surface button 4 in the housing 2. Here, in the present embodiment, the cross-sectional shape of the internal space of the housing 2 along a plane that intersects with the rechargeable battery 27 and that is perpendicular to the up-down direction is a circular shape (see FIG. 7). Therefore, for the area inside the housing 2 at the same height as the rechargeable battery 27, there is a restriction on the space for arranging other components between the rechargeable battery 27 and the inner wall of the housing 2. For this, in the present embodiment, by arranging the rechargeable battery 27 at an angle as described above, it is possible to make it easier to arrange the charging terminal 5 and the side surface button 4 even under circumstances where there is such a space restriction as described above.

Note that in the present embodiment, the angle formed between the front-rear direction and the long axis of the rechargeable battery 27 is about 55°, but this angle is not limited to this. By arranging the rechargeable battery 27 so that the long axis of the rechargeable battery 27 is at an angle to the front-rear direction as described above, it is possible to realize at least the effects described above. For example, sufficient effects can be realized when the angle is 30° or more and 60° or less.

In other embodiments, the rechargeable battery may be arranged so that the angle between the long axis of the rechargeable battery and the front-rear direction is the right angle. Even with such an arrangement, as in the present embodiment, it is easier to arrange the rechargeable battery so as not to interfere with the terminal and the side surface button. Note that when the rechargeable battery 27 is arranged at an angle to the front-rear direction as in the present embodiment, as compared with a case where the angle between the long axis of the rechargeable battery 27 and the front-rear direction is the right angle, it is possible to increase the space between the terminal 5 and the rechargeable battery 27 (specifically, the space where the speaker to be described below is arranged) and the space between the side surface button 4 and the rechargeable battery 27 (specifically, the space where the vibrator to be described below is arranged), thereby making it easier to arrange components in the housing 2.

As shown in FIG. 4, the electronic apparatus 1 includes a holder 28. The holder 28 covers at least a part of the rechargeable battery 27 to protect the rechargeable battery 27. In the present embodiment, the holder 28 is provided above the rechargeable battery 27 and covers at least a part of a portion of the rechargeable battery 27 on the top surface side (i.e., the upper side). Specifically, the holder 28 includes a ceiling portion 121 that is perpendicular to the up-down direction and a side wall portion 122 that extends in the downward direction from the ceiling portion 121 (see FIG. 6). The holder 28 is provided at a position such that the ceiling portion 121 covers the top surface of the rechargeable battery 27 and the side wall portion 122 surrounds the side surface of the rechargeable battery 27. Thus, the holder 28 covers the top surface and the four side surfaces of the rechargeable battery 27. Note that in other embodiments, the holder may further cover a part of the bottom surface of the rechargeable battery 27. For example, the holder may further include a protruding portion extending in the horizontal direction from the lower end of the side wall portion, and the protruding portion may cover a part of the bottom surface of the rechargeable battery 27. In the present embodiment, since the holder 28 does not cover the bottom surface of the rechargeable battery 27, the lower substrate 32 to be described below can be arranged close to (or in contact with) the rechargeable battery 27 below the rechargeable battery 27, and it is possible to reduce the thickness of the electronic apparatus 1.

In the present embodiment, the rechargeable battery 27 is secured to the holder 28. While there is no limitation on the method of fixing, the rechargeable battery 27 is secured to the holder 28 in the present embodiment by bonding the top surface of the rechargeable battery 27 to the lower surface of the ceiling portion 121 of the holder 28 by a double-sided tape, for example. The holder 28 may be secured to the lower housing 12 by screwing, for example. The rechargeable battery 27 is secured to the lower housing 12 as described above.

As shown in FIG. 9, in the present embodiment, the rechargeable battery 27 is sized so that each edge between a side surface and an adjacent side surface comes close to the inner wall of the housing 2 (more specifically, the inner wall of the side surface portion of the housing 2). As shown in FIG. 7, on the reference plane, the opposite ends of the long sides of the rechargeable battery 27 (i.e., the long sides of the rechargeable battery 27 to be a rectangular shape on the reference plane) come close to the housing 2. Thus, it is possible to arrange the rechargeable battery 27 while making efficient use of the space in the housing 2, and to reduce the size of the electronic apparatus 1. Note that in the present embodiment, since the side surface of the rechargeable battery 27 is surrounded by the holder 28, the holder 28 is present between the side surface of the rechargeable battery 27 and the side surface portion of the housing 2 (see FIG. 7). Note however that in other embodiments, the holder may not cover the side surface of the rechargeable battery, in which case the side surface of the rechargeable battery may be in contact with the inner wall of the housing. Note that in the present embodiment, the holder 28 may be in contact with the inner wall of the side surface portion of the housing 2 or may not be in contact (albeit coming close thereto).

In the present embodiment, depressions 2c are formed in the inner wall of the housing 2 at locations that are close to or in contact with corners of the rechargeable battery 27 (see FIG. 9). The holder 28 is arranged with parts of the holder 28 resting in the depressions 2c. Thus, it is possible to reduce the size of the housing 2 (it can also be said that it is possible to maximize the size of the rechargeable battery that can be housed in the housing 2). Note that the holder 28 may or may not be in contact with the depressions 2c. In the present embodiment, the depressions 2c are formed in four locations corresponding to the four lower vertices of the rechargeable battery 27 (see FIG. 9). Note however that in other embodiments, the number of locations in which depressions are formed may be any number from one to three. In other embodiments, the depressions may be formed in at least one of four locations on the inner wall of the housing that correspond to the four upper vertices of the rechargeable battery 27. In other embodiments, if the holder does not cover the side surface of the rechargeable battery, the rechargeable battery may be arranged with parts of the rechargeable battery resting in the depressions. In this case, the rechargeable battery may or may not be in contact with the depressions.

(Vibrator and Speaker)

As shown in FIG. 4 and FIG. 5, the electronic apparatus 1 includes a vibrator 29. The vibrator 29 is used to vibrate the entire electronic apparatus 1 by its own vibration to notify the user by vibration. The vibrator 29 has a shape that has a longitudinal direction (it can be said that it is a shape that is long in one direction), more specifically, it is a columnar shape extending in the longitudinal direction. The vibrator 29 is provided on the side (more specifically, on the left rear side) of the rechargeable battery 27 inside the housing 2 (see FIG. 6, FIG. 9). As shown in FIG. 9, as viewed from above, the vibrator 29 is provided in the space (e.g., Space A enclosed by the dotted line shown in FIG. 9) between the side surface of the rechargeable battery 27 (specifically, the side surface including the second long side) and the inner wall of the housing 2 (more specifically, the inner wall of the side surface portion of the housing 2) that opposes the side surface. More specifically, the vibrator 29 is provided in the space at a position surrounded by the rechargeable battery 27, the inner wall of the housing 2, and the side surface button 4. Note that on the reference plane, the vibrator 29 is provided at a position between the second long side of the rechargeable battery 27 and a portion of the side surface portion of the housing 2 that opposes the second long side (e.g., a position in Space A described above) (see FIG. 7). As described above, as the rechargeable battery 27 is arranged at an angle in the present embodiment, the space can be made larger, making it easier to arrange the vibrator 29.

In the present embodiment, the vibrator 29 is arranged so that the longitudinal direction of the vibrator 29 is parallel to the horizontal direction. The vibrator 29 is provided at a position overlapping with the rechargeable battery 27 as viewed from the horizontal direction. Thus, the vibrator 29 can be arranged while making efficient use of the space in the housing 2 (i.e., the vibrator 29 can be arranged so that the length in the up-down direction is shortened), and to reduce the thickness of the housing 2.

In the present embodiment, the vibrator 29 is arranged so that the longitudinal direction of the vibrator 29 and the long axis of the rechargeable battery 27 are close to each other in orientation (i.e., at an angle smaller than 45°) (see FIG. 9). Note that the speaker may be arranged so that the longitudinal direction of the vibrator 29 and the long axis of the rechargeable battery 27 are parallel to each other. Thus, the vibrator 29 can be arranged in the space while making efficient use of the space, and it is possible to reduce the size of the electronic apparatus 1 as compared with cases where the vibrator 29 is arranged in other orientations. It can also be said that it will be easier to arrange larger vibrators.

The vibrator 29 is secured to the lower housing 12. Specifically, the lower housing 12 includes a frame portion 131 that surrounds the vibrator 29 with respect to the horizontal direction (see FIG. 5, FIG. 9). The frame portion 131 includes walls extending in the upward direction from the reverse side the bottom surface of the lower housing 12, and the vibrator 29 is sandwiched from four sides by the walls. The vibrator 29 is secured to the lower housing 12 by being sandwiched by the walls with some force applied from the walls.

Figure 10:
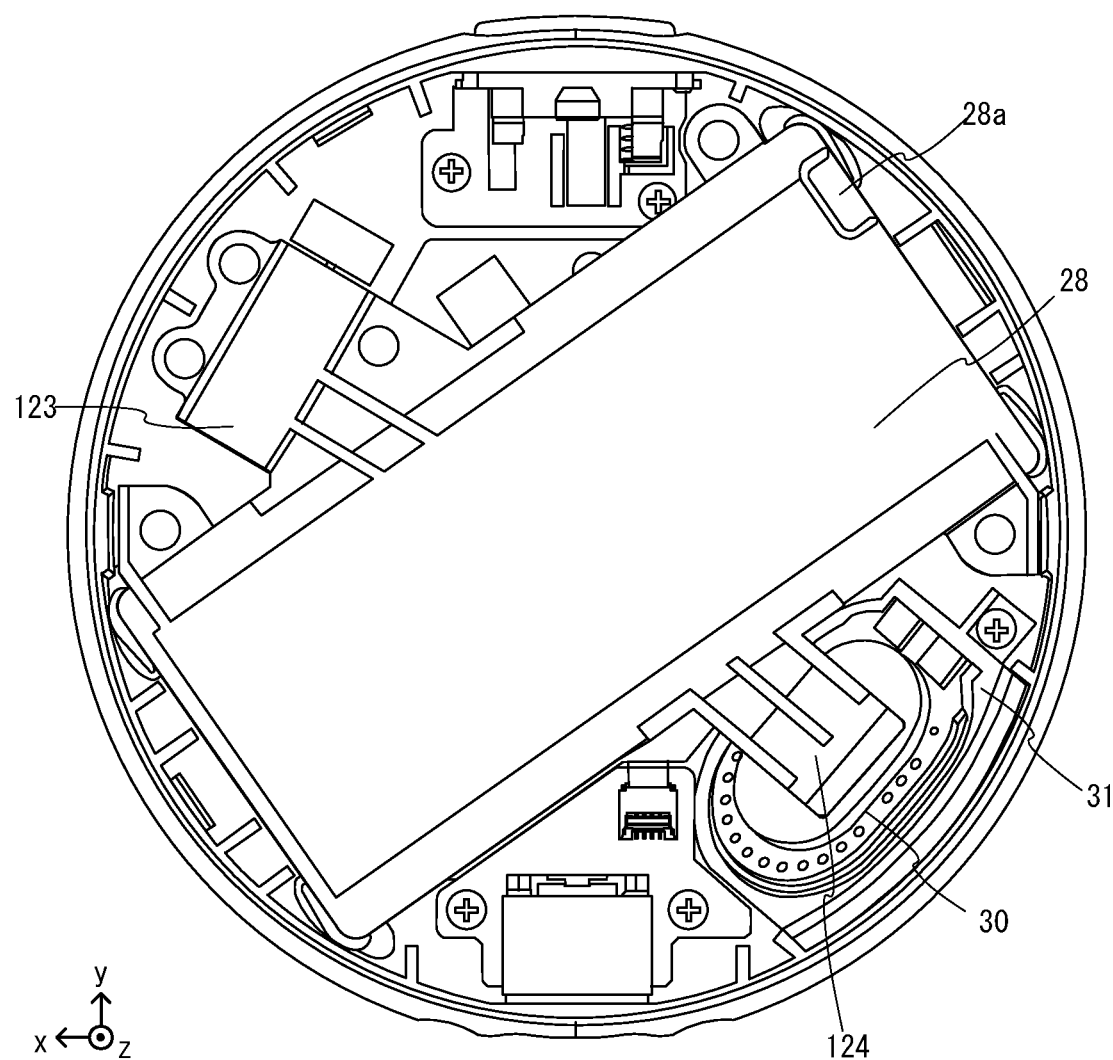
FIG. 10 is a view showing an example of the position of the holder inside the non-limiting housing.

The vibrator 29 is secured also by the holder 28. FIG. 10 is a view showing the position of the holder 28 inside the housing 2. Note that in FIG. 10, components arranged inside the housing 2 that are located on the upper side relative to the holder 28 are omitted. FIG. 10 shows only a portion of the housing 2 that is on the lower side relative to the reference plane is shown for the purpose of making it easier to see the arrangement of the components.

As shown in FIG. 10, the holder 28 covering the rechargeable battery 27 includes a first arm portion 123 extending above the vibrator 29. The first arm portion 123 contacts the upper portion of the vibrator 29 and holds down the vibrator 29 from above (see FIG. 6). Thus, with respect to the up-down direction, the vibrator 29 is secured also by being sandwiched between the inner wall of the lower housing 12 and the holder 28. Thus, the vibrator 29 can be more firmly secured to the housing 2. The vibration caused by the vibrator 29 can be more easily transmitted to the housing 2.

As shown in FIG. 4 and FIG. 5, the electronic apparatus 1 includes a speaker 30. In the present embodiment, the speaker 30 has a flat shape with the upper surface and the reverse surface being larger than other surfaces, and the upper surface and the reverse surface have an elongate shape. The speaker 30 is provided inside the housing 2 on the side (more specifically, on the front right side) of the rechargeable battery 27 (see FIG. 6, FIG. 9). As shown in FIG. 9, as viewed from above, the speaker 30 is provided in the space between the side surface of the rechargeable battery 27 (specifically, the side surface including the first long side) and a portion of the inner wall of the housing 2 (more specifically, the inner wall of the side surface portion of the housing 2) that opposes the side surface (e.g., Space B enclosed by the dotted line in FIG. 9). More specifically, the speaker 30 is provided in the space at a position surrounded by the rechargeable battery 27, the inner wall of the housing 2, and the terminal 5. Note that the speaker 30 is provided at a position between the first long side of the rechargeable battery 27 and a portion of the side surface portion of the housing 2 that opposes the first long side, on the reference plane (see FIG. 7). As described above, as the rechargeable battery 27 is arranged at an angle in the present embodiment, the space can be made larger, making it easier to arrange the speaker 30.

In the present embodiment, the speaker 30 is arranged so that the longitudinal direction of the speaker 30 and the long axis of the rechargeable battery 27 are close to each other in orientation (specifically, oriented at an angle smaller than 45°). Note that the speaker 30 may be arranged so that the longitudinal direction of the speaker 30 and the long axis of the rechargeable battery 27 are parallel to each other. Thus, the speaker 30 can be arranged in the space described above while making efficient use of the space, and it is possible to reduce the size of the electronic apparatus 1 as compared with cases where the speaker 30 is arranged in other orientations. It can also be said that it will be easier to arrange larger speakers.

Note that the electronic apparatus 1 includes a base 31 (see FIG. 4). The speaker 30 is secured to the lower housing 12 via the base 31. Specifically, the base 31 is secured to the inner wall on the reverse side of the bottom surface of the lower housing 12 by screwing, for example. The speaker 30 is secured to the base 31 by being bonded by a double-sided tape, for example.

In the present embodiment, the speaker 30 is secured also by the holder 28. As shown in FIG. 10, the holder 28 covering the rechargeable battery 27 includes a second arm portion 124 extending above the speaker 30. The second arm portion 124 holds the speaker 30 from above via a shock absorber (see FIG. 6). Therefore, the speaker 30 is secured also by being sandwiched between the base 31 and the holder 28. Thus, the speaker 30 can be more firmly secured to the housing 2.

As described above, in the present embodiment, the holder 28, covering at least a part of the rechargeable battery 27, holds the vibrator 29 from above and also holds the speaker 30 from above. That is, in the present embodiment, it can be said that members for securing the rechargeable battery 27, the vibrator 29 and the speaker 30 are integrated. Thus, it is possible to reduce the number of components in the housing 2, which saves space in the housing 2 and makes it easier to manufacture the electronic apparatus 1. Note that while the holder 28 is used to secure the rechargeable battery 27, the vibrator 29 and the speaker 30 in the present embodiment, the holder may secure only the rechargeable battery 27 or may secure either one of the vibrator 29 and the speaker 30 in addition to the rechargeable battery 27 in other embodiments. In other embodiments, the electronic apparatus 1 may include a component different from the holder 30 as a component for holding the vibrator 29 from above, or may include a component different from the holder 30 as a component for holding the speaker 30 from above.

As shown in FIG. 6, in the present embodiment, the speaker 30 having a flat shape is arranged with the upper surface and the reverse surface being at an angle to the horizontal plane. Specifically, the speaker 30 is arranged at an angle in the rotation direction around an axis that is generally parallel to the long axis of the rechargeable battery 27 (which can also be said to be parallel to the long side of the rechargeable battery 27 on the reference plane). More specifically, the speaker 30 is at an angle so that the side closer to the rechargeable battery 27 is lower and the side farther away from the rechargeable battery 27 is higher. It can also be said that the speaker 30 is at an angle so that the side closer to the center of the housing 2 is lower and the side farther away from the center is higher as viewed from above. Thus, the width of the speaker 30 with respect to the direction perpendicular to the long axis of the rechargeable battery 27 (i.e., the width of the speaker 30 as viewed from above) can be made smaller as compared with cases where the speaker 30 having a flat shape is arranged horizontally without being at an angle, and it is possible to reduce the size of the electronic apparatus 1. It can also be said that it becomes easier to arrange larger speakers. Note that the direction in which the speaker 30 is at an angle is not limited to the rotation direction around an axis parallel to the long axis of the rechargeable battery 27, but can be any rotation direction around any axis that is oriented in a direction closer to the long axis than to the short axis of the rechargeable battery 27. Then, as in the present embodiment, it is possible to reduce the size of the electronic apparatus. Note that in other embodiments, the speaker having a flat shape may be arranged so that the upper surface and the reverse surface are parallel to the horizontal plane, or may be arranged so that the upper surface and the reverse surface are perpendicular to the horizontal plane.

The sound hole 2a described above is formed in the side surface portion of the housing 2 at a position near the speaker 30 (see FIG. 6). For example, the sound hole 2a is formed at such a position that the speaker 30 is arranged between the center of the housing 2 and the sound hole 2a as viewed from above. Thus, sound from the speaker 30 is more easily transmitted to the outside of the housing 2. Note that there is no limitation on the position of the sound hole in other embodiments, and the sound hole may be formed on the top surface or the bottom surface of the housing at a position near the speaker, for example.

As described above, in the present embodiment, the vibrator 29 and the speaker 30 are arranged at such positions where the rechargeable battery 27 is sandwiched by the vibrator 29 and the speaker 30 (see FIG. 9). That is, inside the housing 2, the vibrator 29 is arranged on one side of the rechargeable battery 27, and the speaker 30 is arranged on the other side of the rechargeable battery 27. Then, the vibrator 29 and the speaker 30 can be arranged while making efficient use of the space inside the housing 2 other than the rechargeable battery 27, and it is possible to reduce the size of the electronic apparatus 1. This makes it easier to arrange larger vibrators 29 and larger speakers 30.

In other embodiments, the vibrator and the speaker may be arranged on the same side with respect to the rechargeable battery 27. In other embodiments, the electronic apparatus may include a vibrating portion (e.g., a voice coil motor) that is capable of generating vibration as well as sound, instead of having the vibrator 29 and the speaker 30. For example, the vibrating portion may be arranged in the space where the speaker 30 is arranged (i.e., Space B surrounded by the dotted line shown in FIG. 9).

In the present embodiment, the speaker 30 and the vibrator 29 are arranged staggered from each other with respect to the front-rear direction (see FIG. 9). Here, as described above, in the present embodiment, the long axis of the rechargeable battery 27 is at an angle to the front-rear direction. Therefore, on one side, left or right, of the housing 2 (here, the right side), a space (e.g., Space B surrounded by the dotted line shown in FIG. 9) is created on the front side relative to the center of the housing 2, while on the other side (here, the left side), a space (e.g., Space A surrounded by the dotted line shown in FIG. 9) is created on the rear side relative to the center of the housing 2. Therefore, by arranging the speaker 30 and the vibrator 29, which are located on the right side and the left side of the housing 2, respectively, so as to be staggered from each other with respect to the front-rear direction, it is possible to arrange the speaker 30 and the vibrator 29 so as not to interfere with the rechargeable battery 27.

Note that in the present embodiment, the speaker 30 is provided at a position forward relative to the vibrator 29.

The speaker 30 and the sound hole 2a are provided on the front side relative to the center of the housing 2 (which can be said to be the side opposite to the side where the side surface button 4 is provided). Here, in the present embodiment, it is assumed that the user holds the electronic apparatus 1 so that the top surface button 3 is operated with the thumb and the side surface button 4 is operated with the index finger (see FIG. 3). In this case, it is assumed that the user holds the electronic apparatus 1 at an angle so that the front side of the electronic apparatus 1 (i.e., the side where the terminal 5 is provided) moves closer to the front side as seen by the user while the rear side of the electronic apparatus 1 (i.e., the side where the side surface button 4 is provided) moves farther toward the rear side as seen by the user. When the user holds the electronic apparatus 1 as described above, by arranging the speaker 30 and the sound hole 2a on the front side relative to the center of the housing 2, as in the present embodiment, sound from the speaker 30 can be more easily heard by the user. Note that in other embodiments, the arrangement of the speaker 30 and the vibrator 29 in the present embodiment may be switched around.

In the present embodiment, the rechargeable battery 27 is provided so that the center of the housing 2 and the center of the rechargeable battery 27 coincide with or come close to each other as viewed from above. Thus, it is possible to ensure spaces of about the same size on both sides of the rechargeable battery 27 in the housing 2 (i.e., Space A and Space B shown in FIG. 9 can be of about the same size). Note that in other embodiments, the center of the rechargeable battery may be located at a position different from the center of the housing as viewed from above. In other embodiments, if the volume of the speaker is larger than the volume of the vibrator, for example, the rechargeable battery may be arranged so that Space B is larger than Space A.

(Lower Substrate)

As shown in FIG. 4, the electronic apparatus 1 includes the lower substrate 32. The lower substrate 32 is a substrate on which a control circuit (i.e., the control circuit 221 shown in FIG. 15) that executes control process in the electronic apparatus 1 is provided. The electronic apparatus 1 also includes an acceleration sensor (i.e., an acceleration sensor 222 shown in FIG. 15) and a connector 141 (see FIG. 9). In the present embodiment, the acceleration sensor and the connector 141 are provided on the lower substrate 32. The lower substrate 32 is provided below the rechargeable battery 27 (see FIG. 6). The lower substrate 32 is secured to the lower housing 12 (more specifically, to the inner wall on the reverse side of the bottom surface of the lower housing 12) by screwing, for example.

The acceleration sensor is an example of the inertial sensor, and detects the acceleration applied to the electronic apparatus 1. In the present embodiment, the acceleration sensor is provided on the surface on the bottom surface side (i.e., the lower side surface) of the lower substrate 32. By providing the acceleration sensor on the surface on the bottom surface side, it is possible to narrow the gap between the lower substrate 32 and the rechargeable battery 27 arranged upward thereof, thereby saving space. Thus, it is possible to reduce the thickness of the electronic apparatus 1. It is possible to prevent the rechargeable battery 27 and the acceleration sensor from hitting each other. Note that in other embodiments, the electronic apparatus may include other types of inertial sensors (e.g., an angular velocity sensor) instead of (or together with) the acceleration sensor, or may not include the acceleration sensor.

The connector 141 is for electrically connecting together the lower substrate 32 and the rechargeable battery 27. In the present embodiment, a cord is connected to the rechargeable battery 27, and the cord extends from a hole 28a formed in the holder 28 to the outside of the holder 28 to be connected to the connector 141. Thus, the connector 141 is electrically connected to the rechargeable battery 27. Note that the connector 141 is provided at a position on the surface on the top surface side (i.e., the upper side surface) of the lower substrate 32 that is different from the portion directly below the rechargeable battery 27 (i.e., the portion that is hidden by the rechargeable battery 27 as viewed from above) (see FIG. 9). That is, the connector 141 is provided at a position not overlapping with the rechargeable battery 27 as viewed from above. Thus, it is possible to narrow the gap between the lower substrate 32 and the rechargeable battery 27 arranged upward thereof, and it is possible to reduce the thickness of the electronic apparatus.

In the present embodiment, a portion of the surface on the top surface side of the lower substrate 32 that is directly below the rechargeable battery 27 does not include a component protruding from the lower substrate 32 (see FIG. 6). Thus, it is possible to narrow the gap between the lower substrate 32 and the rechargeable battery 27 arranged upward thereof, and it is possible to reduce the thickness of the electronic apparatus. Note that the lower substrate 32 and the rechargeable battery 27 may be arranged with a gap therebetween or in contact with each other. The lower substrate 32 and rechargeable battery 27 may be bonded together.

The lower substrate 32 is provided at a position overlapping with the vibrator 29 and the speaker 30 as viewed from the horizontal direction (see FIG. 6). Thus, it is possible to shorten the length of the housing 2 with respect to the up-down direction, and it is possible to reduce the thickness of the housing 2.

(Bottom Surface Button)

The bottom surface button 6 is provided so that a part thereof is exposed through a hole in the bottom surface of the housing 2. In the present embodiment, the bottom surface button 6 includes a bottom surface keytop 33 and a bottom surface key rubber 34. The bottom surface keytop 33 has an upper surface and a lower surface, and is provided so that the lower surface, which is the exposed surface, covers the hole in the bottom surface of the housing 2 from the inside of the housing 2. The bottom surface key rubber 34 includes a ceiling portion extending parallel to the horizontal direction and a side wall portion extending in the downward direction from the periphery of the ceiling portion. The bottom surface key rubber 34 is provided above the bottom surface keytop 33 and the lower surface of the ceiling portion is in contact with the upper surface of the bottom surface keytop 33. The lower housing 12 includes a frame portion 132 extending in the upward direction from the inner wall of the lower housing 12 around the hole described above (see FIG. 5). With this frame portion in contact with the side wall portion of the bottom surface key rubber 34, the bottom surface key rubber 34 is secured with respect to the horizontal direction. With respect to the up-down direction, the bottom surface key rubber 34 is secured by being sandwiched between the lower substrate 32 thereabove and the lower housing 12 therebelow.

A protruding portion is provided near the center on the upper surface of the ceiling portion of the bottom surface key rubber 34. A bottom surface input detection section for detecting the pressing of the bottom surface button 6 (i.e., a bottom surface input detection section 223 shown in FIG.

15) is provided at a position directly above the protruding portion on the lower surface of the lower substrate 32. While the bottom surface button 6 is not pressed, the protruding portion does not press the bottom surface input detection section. On the other hand, when the bottom surface button 6 is pressed, the bottom surface key rubber 34 is elastically deformed and the protruding portion moves in the upward direction, thereby pressing down the bottom surface input detection section. The bottom surface input detection section detects the pressing of the bottom surface button 6 by detecting being pressed by the protruding portion.

(Upper Substrate)

As shown in FIG. 4, the electronic apparatus 1 includes the upper substrate 40. The upper substrate 40 is provided above the holder 28 inside the housing 2 (see FIG. 6). The upper substrate 40 is secured to the upper housing 11 (more specifically, to the inner wall on the reverse side of the top surface of the upper housing 11) by screwing, for example. In the present embodiment, the side surface input detection section 25 described above and the side surface light-emitting section (i.e., the side surface light-emitting section 224 shown in FIG. 15) are provided on the upper substrate 40. The side surface input detection section 25 is provided at the rear end of the upper substrate 40 so that it is arranged forward of the protruding portion 104 of the side surface keytop 22 of the side surface button 4 described above. The side surface light-emitting section is provided near the front end of the upper substrate 40 so that it is arranged near the front end of the lightguide portion 23 of the side surface button 4 described above. Note that the side surface light-emitting section is an LED, for example.

The electronic apparatus 1 includes a top surface input detection section 41 that detects the pressing of the top surface button 3 and the top surface light-emitting section 42. The top surface input detection section 41 is an electronic component (e.g., a switch) that converts an input (specifically, a press-down input) made on the top surface button 3 into a signal. In the present embodiment, the top surface input detection section 41 is provided on the upper surface of the upper substrate 40, directly below the center position on the exposed surface of the top surface button 3 (see FIG. 12 to be discussed below). Thus, by providing the top surface input detection section 41 on the surface on the top surface side (i.e., the upper surface) of the upper substrate 40, it is possible to narrow the gap between the surface on the bottom surface side (i.e., the lower surface; in other words, the surface on the side of the rechargeable battery 27) of the upper substrate 40 and the rechargeable battery 27, thereby saving space. Thus, it is possible to reduce the thickness of the electronic apparatus 1.

In the present embodiment, the electronic apparatus 1 includes four top surface light-emitting sections 42. Note that the top surface light-emitting sections 42 are light sources for making the top surface button 3 glow, and are LEDs, for example. The four top surface light-emitting sections 42 are provided around the top surface input detection section 41 on the upper surface of the upper substrate 40. By providing the top surface light-emitting sections 42 on the surface on the top surface side of the upper substrate 40, light can be emitted outside of the housing 2 through the light-transmissive top surface button 3. Thus, it is possible to make the top surface button 3 glow (it can also be said that the top surface button 3 can be made to appear glowing). Note that in other embodiments, the number of top surface light-emitting sections is arbitrary and is not limited to four. Note that as will be described in detail below, by providing multiple top surface light-emitting sections 42, the exposed surface of the top surface button 3 can be made to glow evenly.

The electronic apparatus 1 includes an antenna (i.e., an antenna 225 shown in FIG. 15) for communicating with the information processing device described above. In the present embodiment, the antenna is provided on the upper substrate 40.

As described above, in the present embodiment, components protruding from the upper substrate 40 are not provided on a portion of the surface on the bottom surface side (i.e., the lower surface) of the upper substrate 40 that is directly above the rechargeable battery 27 (i.e., a portion that is hidden by the rechargeable battery 27 as viewed from below) (see FIG. 6). Thus, it is possible to narrow the gap between the surface on the bottom surface side of the upper substrate 40 and the rechargeable battery 27, and it is possible to reduce the thickness of the electronic apparatus 1. Note that in the present embodiment, the lower surface of the upper substrate 40 and the upper surface of the holder 28 are bonded by a double-sided tape, for example, as will be described in detail below. However, in other embodiments, the lower surface of the upper substrate and the upper surface of the holder may not be bonded together or may not be in contact with each other.

In the present embodiment, the sum of the area of one side of the lower substrate 32 and the area of one side of the upper substrate 40 is greater than the cross-sectional area of the internal space of the housing 2 along the plane (in the present embodiment, the reference plane) where the cross-sectional area of the internal space of the housing 2 by that plane is greatest among the planes that are perpendicular to the up-down direction. Then, even when the area of the substrates is so large that the substrates cannot fit inside the housing 2 when used as a single substrate, the substrates can be accommodated in the housing 2, and it is possible to reduce the size of the electronic apparatus 1.

In the present embodiment, the speaker 30 and the vibrator 29 described above are arranged below the upper substrate 40 (see FIG. 6). Therefore, as viewed from above, the speaker 30 and the vibrator 29 can be arranged overlapping with the upper substrate 40, and it is possible to reduce the length of the housing 2 with respect to the horizontal direction (i.e., the left-right direction or the front-rear direction). Thus, it is possible to reduce the size of the electronic apparatus 1.

(Top Surface Button 3)

Figure 11:
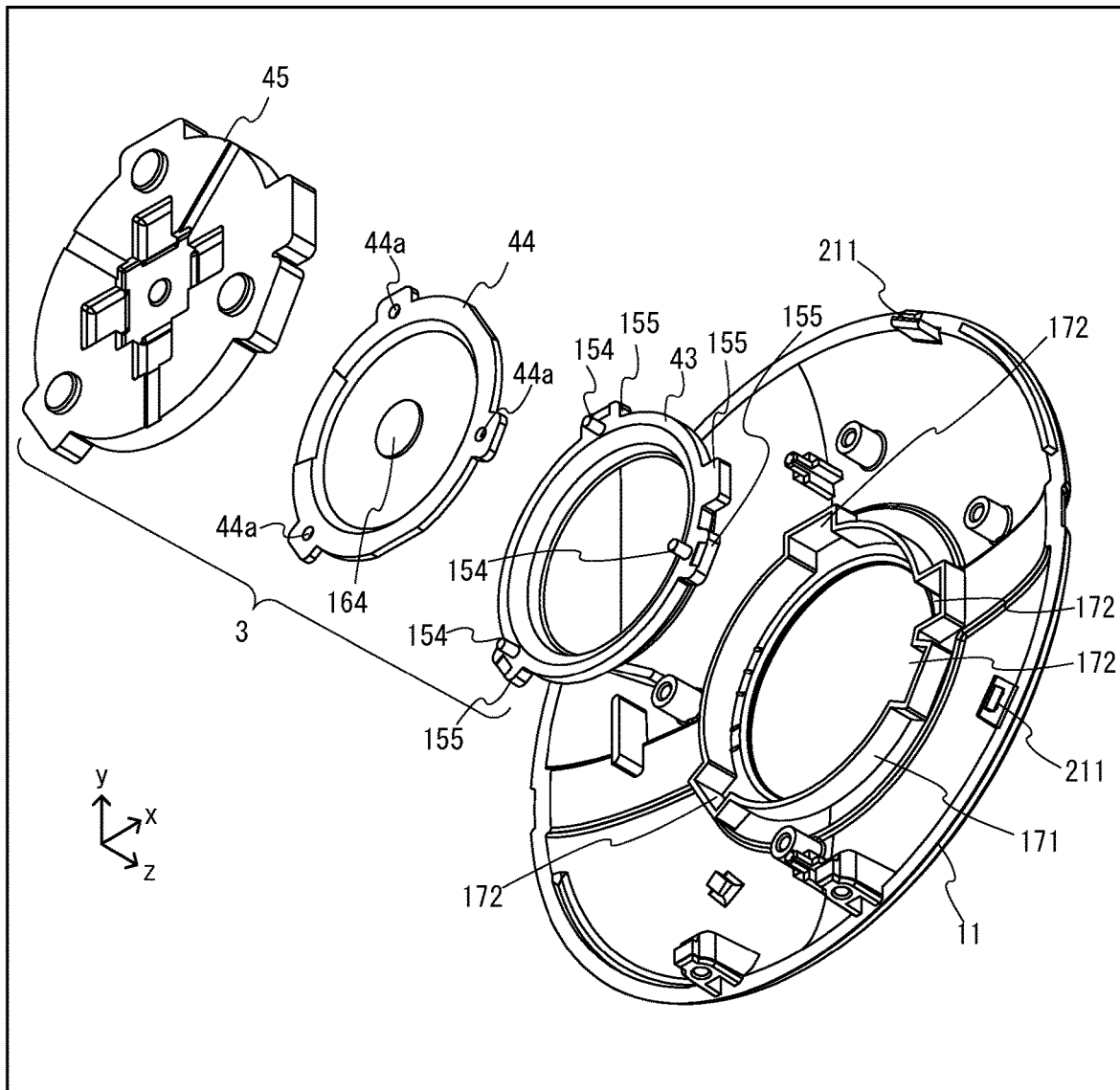
FIG. 11 is an exploded perspective view of an example of a non-limiting top surface button.
Figure 12:
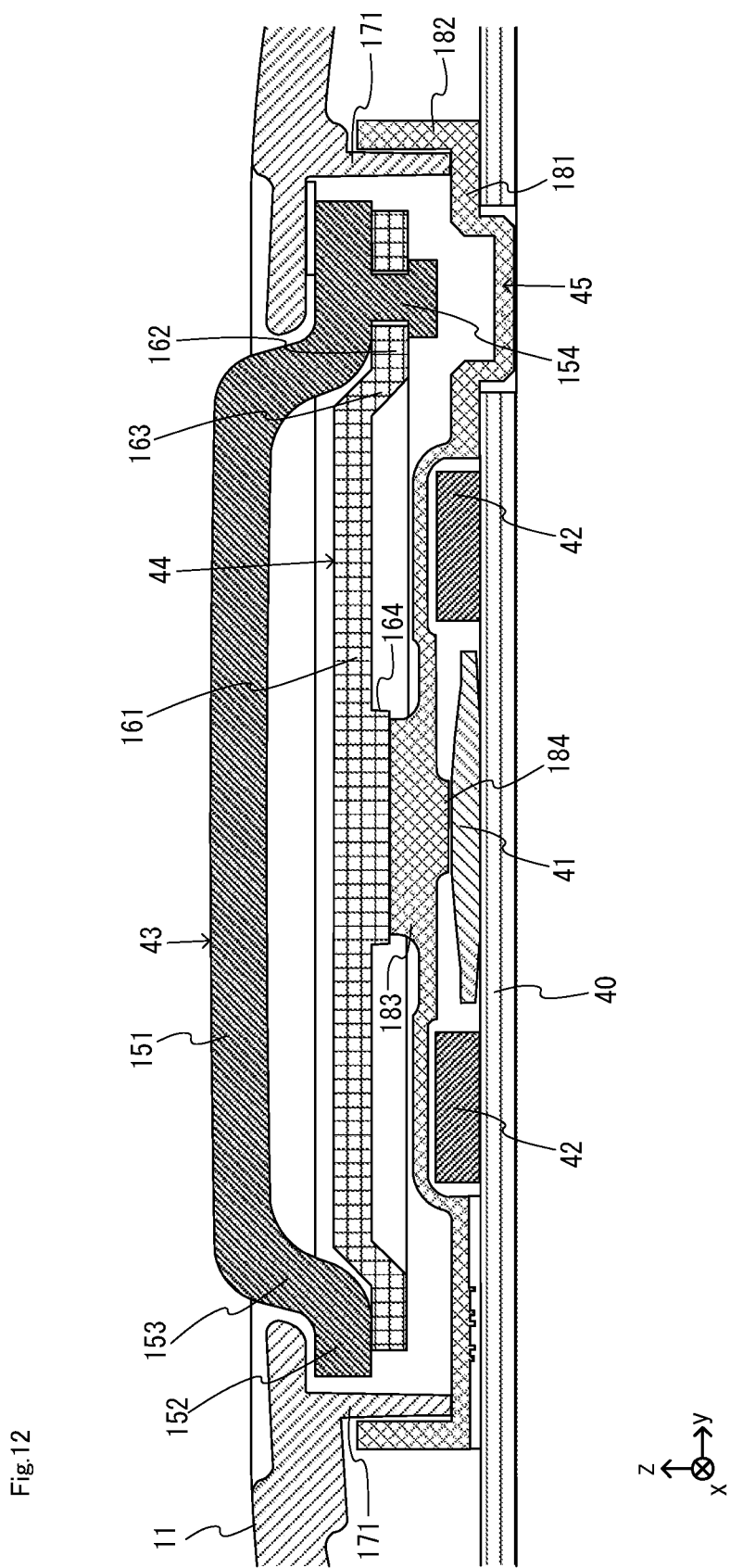
FIG. 12 is a cross-sectional view showing an example of the internal configuration of the non-limiting electronic apparatus.

Referring to FIG. 11 and FIG. 12, etc., a detailed configuration of the top surface button 3 will be described. FIG. 11 is an exploded perspective view of the top surface button 3. Note that FIG. 11 shows the upper housing 11 in addition to the top surface button 3. FIG. 12 is a cross-sectional view showing an example of the internal configuration of the electronic apparatus 1. Note that FIG. 12 shows the upper substrate 40 and elements on the upper side thereof.

The top surface button 3 is provided above the upper substrate 40 (see FIG. 12). As shown in FIG. 11, in the present embodiment, the top surface button 3 includes a top surface keytop 43, a spacer 44 and a top surface key rubber 45. The top surface key rubber 45 is provided above the upper substrate 40, the spacer 44 is provided above the top surface key rubber 45, and the top surface keytop 43 is provided above the spacer 44. The top surface keytop 43 is provided so that a part thereof protrudes from the hole of the upper housing 11.

As shown in FIG. 12, the top surface keytop 43 includes a central portion 151, an outer edge portion 152 and a rising portion 153. The central portion 151 is a portion whose upper surface is exposed through the hole in the upper housing 11 and has a plate shape extending in the horizontal direction. The central portion 151 has a circular shape as viewed from above and is of the same size as or is slightly smaller than the hole. Note that in the present embodiment, the upper surface of the central portion 151 (i.e., the exposed surface described above) is a curved surface that slightly bulges in the upward direction but it may be a flat surface.

The outer edge portion 152 is the outer edge of the top surface keytop 43 and is provided around the central portion 151. As viewed from above, the outer edge portion 152 has a circular ring shape surrounding the central portion 151. The lower surface of the outer edge portion 152 is provided on the lower side relative to the lower surface of the central portion 151.

The rising portion 153 is a portion between the central portion 151 and the outer edge portion 152. The rising portion 153, as viewed from above, has a circular ring shape surrounding the central portion 151. As shown in FIG. 12, the rising portion 153 is provided so as to extend in the up-down direction. Specifically, the rising portion 153 extends in the upward direction from the inner circumferential portion of the outer edge portion 152 and its upper end is connected to the outer circumferential portion of the central portion 151. The rising portion 153 is located on the side of the opening of the hole in the upper housing 11. As described above, in the present embodiment, since the top surface keytop 43 includes the rising portion, the top surface keytop 43 is unlikely to be shifted in the horizontal direction relative to the housing 2, and the top surface keytop 43 is unlikely to come off the housing 2. Note that "extending in the up-down direction" is not limited to extending parallel to the up-down direction as long as the direction of extension includes a component in the up-down direction.

Note that the top surface keytop 43 as a whole is made of a light-transmissive material. However, in other embodiments, only a part (e.g., the central portion) of the top surface keytop may be light-transmissive.

The spacer 44 includes a central portion 161, an outer edge portion 162 and a rising portion 163. The central portion 161 has a plate shape extending in the horizontal direction and has a circular shape as viewed from above. The central portion 161 of the spacer 44 is provided below the central portion 151 of the top surface keytop 43. Note that in the present embodiment, the lower surface of the central portion 161 of the spacer 44 is arranged at about the same height (i.e., about the same position in the up-down direction) as the lower surface of the outer edge portion 152 of the top surface keytop 43. Thus, it is possible to reduce the thickness of the portion composed of the top surface keytop 43 and the spacer 44, and it is possible to reduce the thickness of the top surface button 3. The upper surface of the central portion 161 of the spacer 44 is a flat surface. On the lower surface of the central portion 161, the spacer 44 has a protruding portion 164 that protrudes in the downward direction from the flat portion of the lower surface. The protruding portion 164 is provided at a center location (which can also be said to be the center of the exposed surface of the top surface keytop 43) as viewed from above (see FIG. 12).

The outer edge portion 162 is an outer edge portion of the spacer 44 and is provided around the central portion 161. As viewed from above, the outer edge portion 162 has a circular ring shape surrounding the central portion 161. The lower surface of the outer edge portion 162 is provided on the lower side relative to the lower surface of the central portion 161. The lower surface of the protruding portion 164 is located on the upper side relative to the lower surface of the outer edge portion 162. Thus, it is possible to reduce the thickness of the top surface button 3.

The rising portion 163 is a portion between the central portion 161 and the outer edge portion 162. As viewed from above, the rising portion 163 has a circular ring shape surrounding the central portion 161. As shown in FIG. 12, the rising portion 163 is provided so as to extend in the up-down direction. That is, the rising portion 163 extends in the upward direction from the inner circumferential portion of the outer edge portion 162 and its upper end is connected to the outer circumferential portion of the central portion 161. By providing the rising portion 163 in the spacer 44, it is possible to elongate the gap between the central portion 161 of the spacer 44 and the upper substrate 40. Therefore, it is possible to reduce the possibility of a component on the upper substrate 40 (e.g., the top surface light-emitting section 42) hitting the central portion 161 via a top surface key rubber 45 when the top surface button 3 is pressed. Note that while the rising portion 163 extends in a diagonal upward direction from the outer edge portion 162 in the present embodiment, it may be provided so as to extend in the vertically upward direction from the outer edge portion 162 in other embodiments.

The rising portion 163 of the spacer 44 is provided at a position where at least a part of the rising portion 163 overlaps with the rising portion 153 of the top surface keytop 43 as viewed from above. Note that the rising portion 163 of the spacer 44 can be said to be provided near the rising portion 153 of the top surface keytop 43 (see FIG. 12). Then, for a large portion of the central portion 161 of the spacer 44, the gap from the upper substrate 40 can be increased, and it is possible to reduce the possibility of a component on the upper substrate 40 hitting the central portion via a top surface key rubber 45 when the top surface button 3 is pressed.

Note that the spacer 44 as a whole is composed of a light-transmissive material. Note however that in other embodiments, only a part (e.g., the central portion) of the spacer may be light-transmissive.

The spacer 44 is secured to the top surface keytop 43. Specifically, the outer edge portion 152 of the top surface keytop 43 and the outer edge portion 162 of the spacer 44 are secured to each other. In the present embodiment, the top surface keytop 43 includes projections 154 on the lower surface of the outer edge portion 152, and holes 44a are formed in the outer edge portion 162 of the spacer 44 at the positions of the projections 154 (see FIG. 11). Note that while there are three projections 154 and three holes 44a in the present embodiment, there is no limitation on the number of projections 154 and the number of holes 44a. By applying heat caulking with the protrusions 154 inserted in the holes 44a, the top surface keytop 43 and the spacer 44 are secured together.

As described above, in the present embodiment, while the top surface keytop 43 is not pressed, the outer edge portion 162 of the spacer 44 is in contact with the outer edge portion 152 of the top surface keytop 43 (see FIG. 12). Then, the spacer 44 moves in the downward direction immediately upon the start of pressing of the top surface keytop 43, thereby making it easier to detect the pressing of the top surface button 3. Note that in the present embodiment, the outer edge portion 162 of the spacer 44 is in contact with the outer edge portion 152 of the top surface keytop 43 both when the top surface keytop 43 is not pressed and when the top surface keytop 43 is pressed. Note however that in other embodiments, while the top surface keytop 43 is not pressed, the outer edge portion 162 of the spacer 44 may not be in contact with the outer edge portion 152 of the top surface keytop 43, and while the top surface keytop 43 is pressed, the outer edge portion 162 of the spacer 44 may be in contact with the outer edge portion 152 of the top surface keytop 43.

In other embodiments, the outer edge portion 162 of the spacer 44 and the outer edge portion 152 of the top surface keytop 43 may be connected together via a middle member. For example, the electronic apparatus may include, as the middle member, a shock absorber sandwiched between the upper surface of the outer edge portion 162 of the spacer 44 and the lower surface of the outer edge portion 152 of the top surface keytop 43. Even in this case, the spacer 44 can be moved in the downward direction in response to the pressing of the top surface keytop 43.

Note that a frame portion 171 extending in the downward direction is provided on the inner wall of the upper housing 11 (see FIG. 11). The frame portion 171 is provided so as to surround the outer edge portion 152 of the top surface keytop 43 (see FIG. 12). The outer edge portion 152 of the top surface keytop 43 as viewed from above has a generally circular shape, but includes a protruding portion 155 protruding outward of the circle on a part thereof. The frame portion 171 has a recess 172 into which a protruding portion 155 can fit, and the top surface keytop 43 is arranged so that a protruding portion 155 fits into the recess 172 with respect to the horizontal direction. Then, the top surface keytop 43 (and the spacer 44) is positioned with respect to the horizontal direction and is configured to be movable in the up-down direction. Note that in the present embodiment, the number of protruding portions 155 and the number of recesses 172 are four, but may be any number of one or more.

The top surface key rubber 45 includes a bottom portion 181 and a side wall portion 182 (see FIG. 12). The bottom portion 181 extends in the horizontal direction below the spacer 44. The side wall portion 182 is annular and is provided so as to extend in the upward direction from the outer circumference of the bottom portion 181. The upper end of the side wall portion 182 is in contact with or extends to the vicinity of the inner wall of the upper housing 11 (more specifically, the portion around the hole in the inner wall). The inside of the side wall portion 182 being in contact with the outside of the frame portion 171 of the upper housing 11 allows the top surface key rubber 45 to be positioned with respect to the horizontal direction. The top surface key rubber 45 is positioned with respect to the up-down direction as a part of the lower surface of the bottom portion 181 is in contact with the upper surface of the upper substrate 40 and a part of the upper surface of the bottom portion 181 is in contact with the lower end of the frame portion 171 of the upper housing 11.

The top surface key rubber 45 is composed of a light-transmissive and elastic material. Note that in the present embodiment, the top surface key rubber 45 is made of a light-transmissive material as a whole. Note however that in other embodiments, only a part (e.g., a bottom portion) of the top surface key rubber may be light-transmissive.

As shown in FIG. 12, a portion of the bottom portion 181 that is above the top surface input detection section 41 and the top surface light-emitting section 42 provided on the upper substrate 40 protrudes in the upward direction (it can also be said that the lower surface of the bottom portion 181 is depressed in the upward direction). Thus, a portion of the bottom portion 181 that is other than the top surface input detection section 41 and the top surface light-emitting section 42 can be arranged in contact with or close to the upper substrate 40, and it is possible to reduce the thickness of the top surface button 3.

An upper protruding portion 183 protruding in the upward direction is provided on the upper surface of the bottom portion 181 at a position directly below the protruding portion 164 on the lower surface of the spacer 44 (see FIG. 12). In the present embodiment, while the top surface keytop 43 is not pressed, the upper protruding portion 183 is in contact with the lower surface of the protruding portion 164 of the spacer 44. A lower protruding portion 184 protruding in the downward direction is provided on the lower surface of the bottom portion 181 at a position below the protruding portion 164 of the spacer 44 (see FIG. 12). While the top surface button 3 is not pressed, the lower surface of the lower protruding portion 184 may or may not be in contact with the top surface input detection section 41.

Note that in the present embodiment, at least a part of the upper surface of a portion of the top surface key rubber 45 that is located directly above the top surface input detection section 41 (i.e., the upper protruding portion 183) is located directly above the top surface light-emitting section 42. Then, it is possible to reduce the possibility of the spacer 44 hitting a portion of the top surface key rubber 45 that is located directly above the top surface light-emitting section 42 when the top surface button 3 is pressed, and it is possible to reduce the possibility of the spacer 44 hitting the top surface light-emitting section 42 via the top surface key rubber 45.

In the present embodiment, the top surface light-emitting section 42 is provided at a position on the upper substrate 40 excluding a portion of the central portion 161 of the spacer 44 directly below the protruding portion 164 (see FIG. 12). This also reduces the possibility of the spacer 44 hitting the top surface light-emitting section 42 via the top surface key rubber 45.

With the configuration described above, the top surface button 3 is movable in the up-down direction and the top surface input detection section 41 can detect the press-down input to the top surface button 3. Specifically, while the top surface button 3 is not pressed, the top surface keytop 43 is most protruding from the upper housing 11. That is, the upper surface of the outer edge portion 152 of the top surface keytop 43 is in contact with the inner wall of the upper housing 11. Note that the upper surface of the outer edge portion 152 of the top surface keytop 43 hits the inner wall of the upper housing 11 via a shock absorber in the present embodiment, but the upper surface of the outer edge portion 152 of the top surface keytop 43 may directly hit the inner wall of the upper housing 11 in other embodiments.

While the top surface button 3 is not pressed, the protruding portion 164 of the spacer 44 is in contact with the upper protruding portion 183 of the top surface key rubber 45. Therefore, the top surface keytop 43 and the spacer 44 do not move unless a force is applied with respect to the up-down direction. According to the above, the top surface key rubber 45 deforms immediately upon the start of pressing of the top surface keytop 43, thereby making it easier to detect the pressing of the top surface button 3. Note that in other embodiments, the protruding portion of the spacer does not have to be in contact with the upper protruding portion of the top surface key rubber in the state described above.

While the top surface button 3 is not pressed, the lower protruding portion 184 of the top surface key rubber 45 does not press the top surface input detection section 41. Note that at this time, the lower protruding portion 184 of the top surface key rubber 45 may or may not be in contact with the top surface input detection section 41 to such an extent that almost no force is applied on the top surface input detection section 41.

When the top surface keytop 43 is pressed by the user, the top surface keytop 43 and the spacer 44 move in the downward direction. Note that while the top surface button 3 is pressed, the protruding portion 164 of the spacer 44 is in contact with the upper protruding portion 183 of the top surface key rubber 45. Therefore, in response to the movement in the downward direction of the spacer 44, the top surface key rubber 45 deforms and the lower protruding portion 184 of the top surface key rubber 45 moves in the downward direction. In the state described above, the lower protruding portion 184 of the top surface key rubber 45 is in contact with the top surface input detection section 41, and therefore the lower protruding portion 184 of the top surface key rubber 45 presses the top surface input detection section 41. The top surface input detecting section 41 detects the pressing of the top surface button 3 by detecting the pressing of the lower protruding portion 184 of the top surface key rubber 45. Then, the top surface input detection section 41 outputs a signal indicating the press-down.

As described above, in the present embodiment, the electronic apparatus 1 includes a light-transmissive and elastically deformable rubber portion (i.e., top surface key rubber 45) between the spacer 44 and the substrate (i.e., the upper substrate 40). In response to the movement in the downward movement of the spacer 44 as a result of the pressing of the keytop (i.e., the top surface keytop 43), the protruding portion 164 of the spacer 44 presses the detection section (i.e., the top surface input detection section 41) via the rubber portion. Then, the rubber portion can provide a force to push back the keytop when the keytop is pressed. Since the detection section is pressed via the rubber portion, it is possible to reduce the unevenness in how the keytop is pressed.

In the present embodiment, the detection section (i.e., the top surface input detection section 41) is provided directly below the center position of the keytop (i.e., the top surface keytop 43) (see FIG. 12). Therefore, the pressing against the keytop can be more reliably detected by the detection section.

Note that in the present embodiment, the top surface input detection section 41 has the function of producing a clicking feel when pressed. For example, the top surface input detection section 41 is a tactile switch. Note that there is no limitation on the specific configuration for generating a clicking feel when pressed. Here, in the present embodiment, the spacer 44 is arranged between the top surface keytop 43 and the top surface key rubber 45, and it is therefore possible to reduce the thickness of the top surface key rubber 45. Therefore, even when the top surface input detection section 41 is pressed via the top surface key rubber 45, the clicking feel by the top surface input detection section 41 can be transmitted to the top surface keytop 43, thereby providing a clicking feel to the user who has pressed the top surface button 3.

In the present embodiment, a depression that is depressed in the downward direction is formed at a position on the bottom portion 181 of the top surface key rubber 45 that includes a portion directly below the projection 154 of the outer edge portion 152 of the top surface keytop 43 and the hole 44a of the outer edge portion 162 of the spacer 44 (see FIG. 12). A hole is formed at the location described above on the upper substrate 40 (see FIG. 12). Thus, it is possible to reduce the possibility of the lower end of the projection 154 (i.e., the portion that is heat caulked) hitting the upper substrate 40 when the top surface button 3 is pressed. Note that in the present embodiment, the depression on the top surface key rubber 45 and the hole in the upper substrate 40 are sized so that the projection of the top surface keytop 43 is not in contact when the top surface button 3 is pressed.

In the present embodiment, light from the top surface light-emitting section 42 passes through the top surface button 3 and is emitted to the outside of the housing 2, with which it is possible to make the top surface button 3 glow. Note that in the present embodiment, the exposed surface of the top surface keytop 43 is provided with a film that scatters light. Thus, when the top surface light-emitting section 42 emits light, the exposed surface of the top surface button 3 appears to be glowing.

Figure 13:
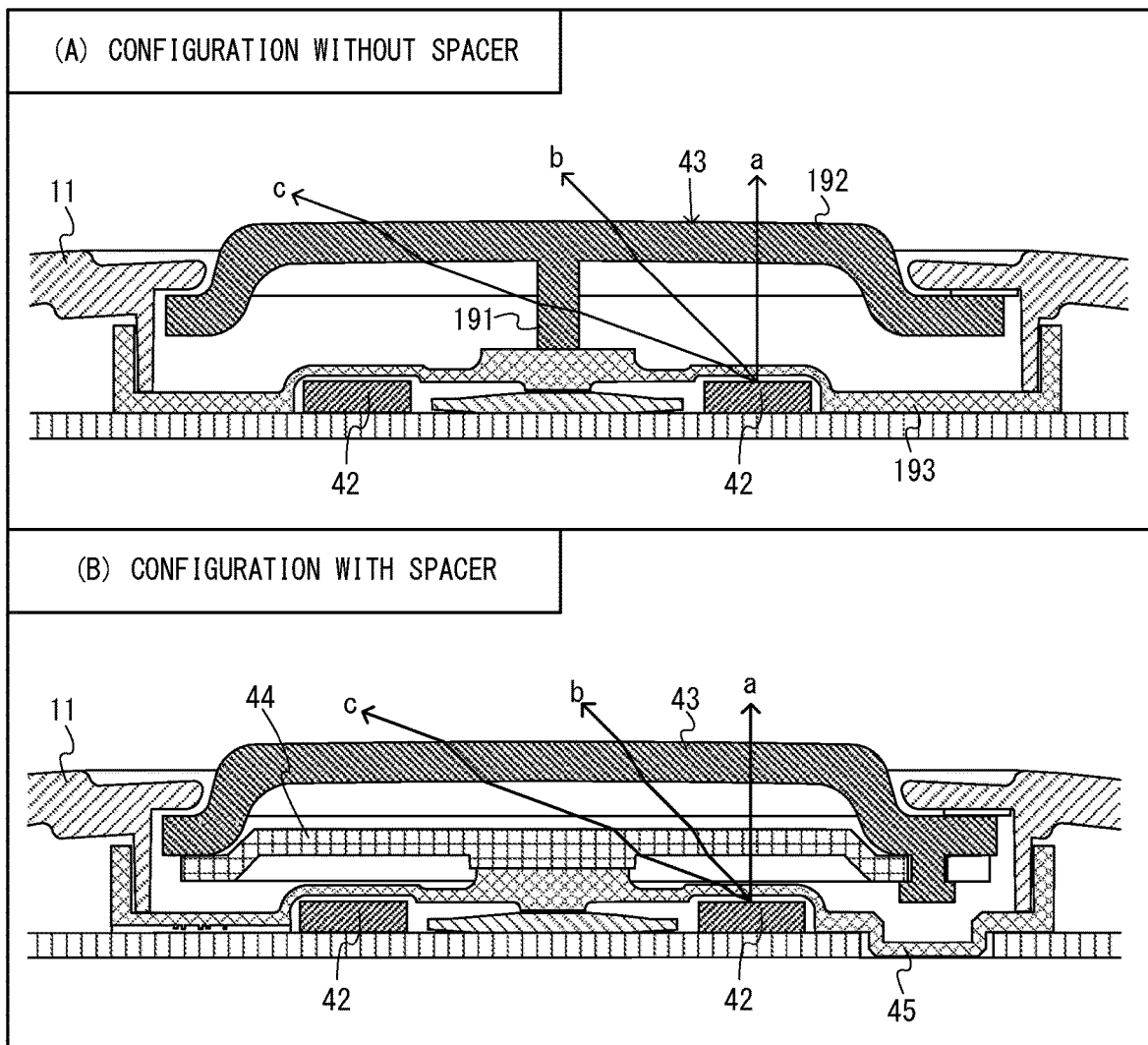
FIG. 13 is a view showing an example of a difference in the path of light with and without a non-limiting spacer.

Here, in the present embodiment, with the spacer 44, light of the light source can be emitted evenly from the exposed surface. FIG. 13 is a view showing an example of the difference in the path of light with and without the spacer 44. Note that (a) shown in FIG. 13 shows the path of light in the configuration without the spacer 44 provided below the top surface keytop 43, and (b) shown in FIG. 13 shows the path of light in the configuration with the spacer 44 provided below the top surface keytop 43, as in the present embodiment. Note that FIG. 13 shows the path of light emitted from only one top surface light-emitting section 42 for the purpose of making the drawing easier to understand.

As shown in (a) of FIG. 13, when the spacer 44 is not provided, the top surface keytop 43 is provided with a shaft portion 191 for pressing a top surface key rubber 193 instead of the spacer 44 when the top surface button 3 is pressed. The shaft portion 191 extends in the downward direction from the lower surface of a central portion 192 of the top surface keytop 43. Therefore, a part of the light emitted from the top surface light-emitting section 42 passes through a shaft portion 191 before being emitted from the exposed surface of the top surface keytop 43, thereby changing the path of the light, whereas another part is emitted from the exposed surface without passing through the shaft portion 191. As a result, for example, in the example shown in (a) of FIG. 13, the interval between path b and path c on the exposed surface is wider. Therefore, the light emitted from the exposed surface tends to be uneven, and it is difficult to make the exposed surface glow evenly. Even if a shaft portion 191 is made of a light-transmissive material, the loss of light passing through a shaft portion 191 is greater than that through air, so the amount of light emitted from the exposed surface through path c, where light passes through the shaft portion 191, is smaller than through path b, where light does not pass through the shaft portion 191. Also with this reason, the light emitted from the exposed surface tends to be uneven.

In contrast, when the spacer 44 is provided as shown in (b) of FIG. 13, a shaft portion 191 described above is not provided, and the path of a part of light emitted from the top surface light-emitting section 42 is not changed by the shaft portion 191. Therefore, for example, in the example shown in (b) of FIG. 13, the gap between path b and path c on the exposed surface is narrower than in the example shown in (a) of FIG. 13. Therefore, the light emitted from the exposed surface is less likely to be uneven, making it easier to make the exposed surface glow evenly.

Note that while the protruding portion 164 is provided on the lower surface of the spacer 44 in the present embodiment, the lower surface of the spacer may be made flat (i.e., without the protruding portion 164) in other embodiments. Then, the path of light is no longer changed by a part of light emitted from the top surface light-emitting section 42 passing through the protruding portion 164, and the light emitted from the exposed surface will be less likely to be uneven.

Note that in the present embodiment, the protruding portion 164 is provided at a position on the lower side relative to the upper surface of the outer edge portion 152 of the top surface keytop 43 with respect to the up-down direction (see FIG. 12). Thus, light coming from the top surface light-emitting section 42 and passing through the spacer 44 to be emitted from the exposed surface is unlikely to pass through the protruding portion 164, so the light emitted from the exposed surface is unlikely to be uneven. Note that the protruding portion 164 may be provided at a position on the lower side relative to the lower surface of the outer edge portion 152 of the top surface keytop 43 with respect to the up-down direction. Then, the light coming from the top surface light-emitting section 42 and passing through the spacer 44 to be emitted from the exposed surface is more unlikely to pass through the protruding portion 164, so the light emitted from the exposed surface is more unlikely to be uneven.

In other embodiments, in order to reduce unevenness of light emitted from the exposed surface due to the shaft portion 191 described above, one may employ a configuration in which the thickness (i.e., the length in the up-down direction) of the central portion of the top surface keytop is increased or may employ a configuration in which the thickness of the bottom portion of the top surface key rubber is increased, instead of a configuration in which the spacer is used. The configuration in which the thickness of the central portion of the top surface keytop is increased is, for example, a configuration in which the lower surface of the central portion of the top surface keytop is set to be about as high as (i.e., about the same position with respect to the up-down direction as) the lower surface of the outer edge portion, so that the lower surface of the central portion of the top surface keytop is in contact with or close to the top surface key rubber 45.

Figure 14:
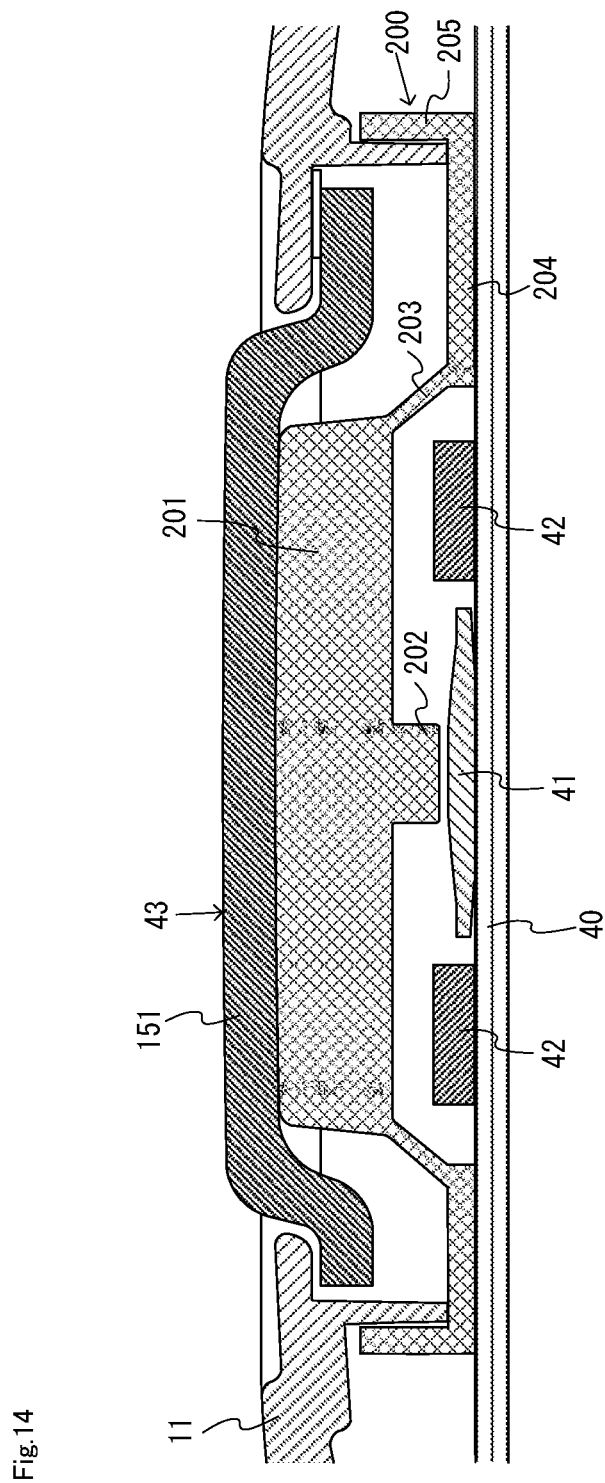
FIG. 14 is a view showing an example of a comparative example of a non-limiting top surface button.

The configuration in which the thickness of the bottom portion of the top surface key rubber is increased is, for example, a configuration in which the upper surface of the top surface key rubber is arranged at about a height such that it is in contact with or close to the lower surface of the center portion of the top surface keytop. An example of this configuration is shown in FIG. 14. FIG. 14 is a view showing a comparative example of the top surface button 3. The comparative example shown in FIG. 14 differs from the present embodiment in that the spacer is not used and the shape of the top surface key rubber is different.

In the comparative example, a top surface key rubber 200 includes a central portion 201, a lower protruding portion 202, a skirt portion 203, a bottom portion 204 and a side wall portion 205. In the comparative example, the central portion 201 is provided below the central portion 151 of the top surface keytop 43. The lower protruding portion 202 is provided on the lower surface of the central portion 201 at a position directly above the top surface input detection section 41 and protrudes in the downward direction from the lower surface. Note that the central portion 201 of the top surface key rubber 200 is formed to be thick enough that the upper surface is in contact with the lower surface of the top surface keytop 43 and the lower surface of the central portion 201 is not in contact with the top surface light-emitting section 42 when the top surface button 3 is pressed.

The skirt portion 203 is provided so as to extend in a diagonal downward direction (more specifically, in a direction having a component in the downward direction and toward the outside of the central portion 201) from the outer circumference of the lower surface of the central portion 201. The skirt portion 203 has a shape of a portion of the side surface of a cone that is between two planes that extend through the side surface and parallel to the horizontal direction. The bottom portion 204 is provided so as to extend in the horizontal direction further outward from the outer circumference of the skirt portion 203. The side wall portion 205 has a shape similar to the side wall portion 182 of the embodiment described above and is provided so as to extend in the upward direction from the outer circumference of the bottom portion 204. The skirt portion 203, the bottom portion 204 and the side wall portion 205 each have an annular shape.

In the comparative example, when the top surface keytop 43 is pressed by the user, the top surface keytop 43 moves in the downward direction. In response to this, the central portion 201 of the top surface key rubber 200 moves in the downward direction, and the lower protruding portion 202 presses the top surface input detecting portion 41. The top surface input detection section 41 detects the pressing of the top surface button 3 by detecting the pressing of the lower protruding portion 184 of the top surface key rubber 45. Note that since the skirt portion 203 deforms while the top surface keytop 43 is pressed, the skirt portion 203 returns to its original shape when the pressing is released, thereby returning the top surface keytop 43 to its position before being pressed.

Note that in the case of the configuration in which the thickness of the central portion of the top surface keytop 43 is increased, the manufacturing of the top surface keytop 43 (e.g., forming the light-scattering film described above on the exposed surface) may become difficult. In the case of the configuration in which the thickness of the bottom portion of the top surface keytops 45 is increased as in the comparative example, the operation feel when pressing the top surface button 3 may deteriorate (e.g., because the top surface keytop 200 is thick, a press is detected after the top surface keytop 200 is deformed to some extent, and thus a press may not be detected immediately when the top surface keytop 43 is pressed). In contrast, in the present embodiment, the thickness of the top surface keytop 43 and the top surface key rubber 45 does not need to be increased by providing the spacer 44, thus making it easier to manufacture the top surface keytop 43 and improving the operating feel when pressing the top surface button 3.

Note that in other embodiments, the top surface key rubber may have a structure with a skirt portion around a portion (i.e., the central section 201) located directly above the top surface input detection section 41 as shown in the comparative example, instead of the structure of the top surface key rubber 45 of the present embodiment. Then, when the top surface button 3 is pressed, a clicking feel can be generated by the top surface key rubber. In this case, the top surface input detection section 41 does not need to have the function of generating a clicking feel. Note that in order to generate a clicking feel by the skirt portion of the top face key rubber, the skirt portion need to have a certain height. In contrast, in the present embodiment, the top surface key rubber is not provided with the skirt portion, thereby reducing the thickness of the top surface key rubber and reducing the thickness of the top surface button.

(Assembly of Electronic Apparatus 1)

In the present embodiment, the electronic apparatus 1 can be assembled by, for example, attaching components to the upper housing 11 and attaching components to the lower housing 12, and then securing together the upper housing 11 and the lower housing 12 with the attached components thereon. For the upper housing 11, the state where components are attached thereto is achieved by attaching the upper substrate 40 to the upper housing 11 with the top surface button 3 arranged on the upper housing 11. For the lower housing 12, the state where components are attached thereto is achieved by attaching the side surface button 4, the bottom surface button 6, the vibrator 29, the base 31 on which the speaker 30 is secured, the lower substrate 32, the terminal 5 and the terminal substrate 26 to the lower housing 12, and then attaching the holder 28 on which the rechargeable battery 27 is secured to the lower housing 12.

In the present embodiment, the upper housing 11 and the lower housing 12 are secured together by engaging portions 211 and receiving portions 212. Specifically, the upper housing 11 includes the engaging portions 211 on the inner side of the housing 2 at the outer circumference portion of the upper housing 11 (see FIG. 11). The engaging portions 211 are provided so as to protrude in the downward direction from the lower end of the portion of the upper housing 11 excluding the engaging portions 211. Note that the engaging portion 211 includes a shaft portion extending in the downward direction from the portion of the upper housing 11 and a hook portion that projects from the shaft portion toward the outside (i.e., outside of the upper housing 11). Note that while FIG. 11 shows only two engaging portions 211, the upper housing 11 includes three engaging portions in the present embodiment. In other embodiments, there is no limitation on the number of engaging portions. There is also no limitation on the shapes of the engaging portions and the receiving portions.

The lower housing 12 includes the receiving portions 212 inside the lower housing 12 (see FIG. 9). The receiving portions 212 have a shape that can be hooked by the engaging portions 211, and is provided at a position to be hooked by the engaging portions 211 when the edge portion of the upper housing 11 is aligned with the edge portion of the lower housing 12. In the present embodiment, the receiving portions 212 have a shape with a downwardly-facing surface extending toward the center of the housing 2. As the hook portion of the engaging portion 211 is hooked onto the downwardly-facing surface, the engaging portion 211 engages with the receiving portion 212.

As described above, in the present embodiment, the upper housing 11 includes the engaging portions 211 and the lower housing 12 includes the receiving portions 212 to which the engaging portions 211 can engage. Therefore, the upper housing 11 and the lower housing 12 can be secured to each other by engaging the receiving portions 212 to the engaging portions 211. Where the upper housing 11 and the lower housing 12 are secured by bonding, for example, the housings may become larger because adhesive surfaces are provided on the housings. In contrast, in the present embodiment, there is no need to provide adhesive surfaces on the housings, and it is possible to reduce the size of the housings. Note that in other embodiments, the lower housing may be provided with engaging portions and the upper housing may be provided with receiving portions. That is, one of the upper housing and the lower housing may have engaging portions, while the other one of the upper housing and the lower housing may have receiving portions.

Note that in the lower housing 12, at least one (herein, two) of the receiving portions 212 is provided on a portion of the inner wall of the housing 2 that opposes a surface parallel to the short axis of the rechargeable battery 27 (which may be said to be a surface including the short side of the rechargeable battery 27) (see FIG. 9). Here, the space sandwiched between the surface parallel to the short axis of the rechargeable battery 27 and the inner wall of the housing is smaller than the space sandwiched between the surface parallel to the long axis of the rechargeable battery 27 and the side surface portion, and is a space in which the vibrator 29 or the speaker 30 is difficult to arrange. By arranging the receiving portion smaller than the vibrator 29 or the speaker 30 in such a space, components can be arranged while making efficient use of the space inside the housing 2, and it is possible to reduce the size of the electronic apparatus 1.

In the present embodiment, the upper housing 11 and the lower housing 12 are also secured to each other by screws. Specifically, holes 2*d* are formed both on the left side and the right side of the terminal 5 in the side surface portion of the lower housing 12 (see FIG. 1). Although not shown in the figure, screw holes are formed in the upper housing at the back of the holes. The upper housing 11 and the lower housing 12 are secured by screwing screws into the screw holes in the upper housing 11 while penetrating through the holes of the lower housing 12. Thus, by securing the upper housing 11 and the lower housing 12 by screwing in addition to the engaging portions and the receiving portions, the upper housing 11 and the lower housing 12 can be secured more firmly.

In the present embodiment, when the lower housing 12 is attached to the upper housing 11, the surface on the top surface side of the holder 28 and the surface on the bottom surface side of the upper substrate 40 are bonded. Thus, it is possible to more firmly secure the components inside the housing 2. Note that as described above, in the present embodiment, the upper substrate 40 is secured to the upper housing 11 and the holder 28 is secured to the lower housing 12. Therefore, the upper housing 11 and the lower housing 12 are secured together also by bonding between the holder 28 and the upper substrate 40 in addition to the engagement between the engaging portions and the receiving portions. Thus, it is possible to more firmly secure together the upper housing 11 and the lower housing 12.

In the present embodiment, the top surface of the housing 2 has a shape bulging in the upward direction, and the bottom surface has a shape bulging in the downward direction. Here, as viewed from the direction perpendicular to the up-down direction, the height of the lower housing 12 is higher than the height of the upper housing 11 (see FIG. 6). That is, the boundary between the upper housing 11 and the lower housing 12 is provided at a position that is different from the ends of the housing with respect to the direction perpendicular to the up-down direction (e.g., the front end, the rear end, the right end and the left end) (specifically, on the upper side relative to the ends). Thus, it is possible to reduce the possibility of the upper housing and the lower housing coming off of each other due to the boundary hitting other objects. Where a hole is formed in the side surface portion of the housing 2 as in the present embodiment, the hole can be formed in one of the housings 2 (herein, the lower housing 12) by making the heights of the two housings 2 different from each other. Then, the hole opening can be formed by an integral component, and it is possible to improve the strength of the hole portion.

3. Electric Configuration

Figure 15:
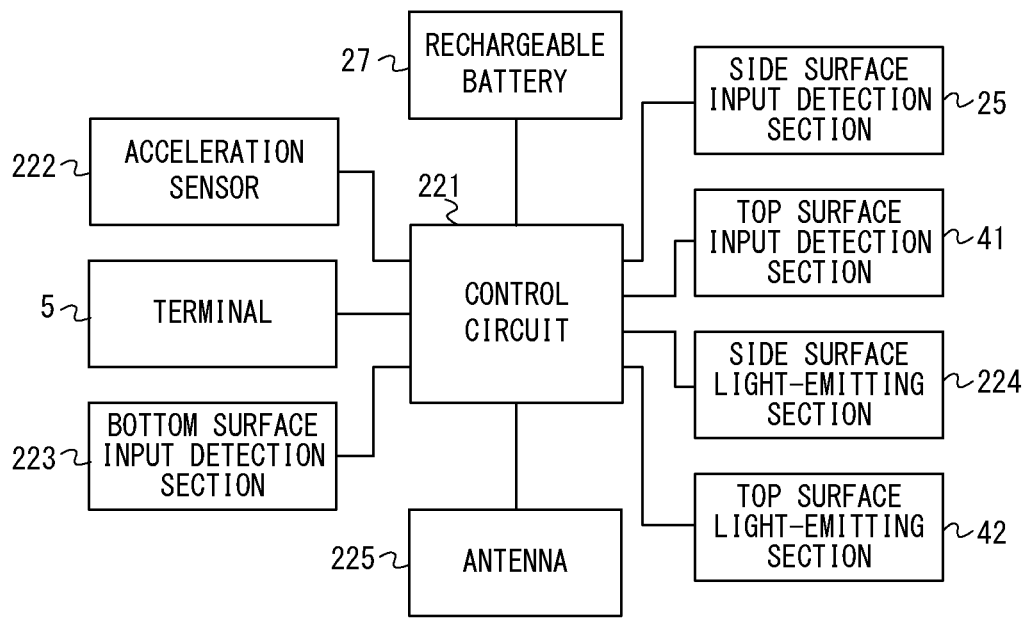
FIG. 15 is a block diagram showing electrical connections between components of the non-limiting electronic apparatus.

FIG. 15 is a block diagram showing the electrical connection relationship between components of the electronic apparatus 1. As shown in FIG. 15, the control circuit 221 is electrically connected to the rechargeable battery 27, the acceleration sensor 222, the terminal 5, the bottom surface input detection section 223, the side surface input detection section 25, the top surface input detection section 41, the side surface light-emitting section 224, the top surface light-emitting section 42 and the antenna 225.

The control circuit 221 is a processing circuit that includes a processor and a memory, e.g., an MCU (Micro Controller Unit). The control circuit 221 is electrically connected to the rechargeable battery 27 via the connector 141 described above, which is provided on the lower substrate 32. The control circuit 221 supplies power from the rechargeable battery 27 to components electrically connected to the control circuit 221 (specifically, the acceleration sensor 222, the bottom surface input detection section 223, the side surface input detection section 25, the top surface input detection section 41, the side surface light-emitting section 224, the top surface light-emitting section 42 and the antenna 225). Where external power is supplied to the electronic apparatus 1 from the charging terminal 5 by, for example, electrically connecting the terminal 5 to a charger or an AC adapter, the control circuit 221 charges the rechargeable battery 27 with the supplied power.

The control circuit 221 obtains a signal output from the acceleration sensor 222. This signal indicates the detection result (i.e., acceleration applied to the electronic apparatus 1) detected by the acceleration sensor 222, for example. The control circuit 221, for example, executes a process based on the detection result or transmits the detection result to the information processing device described above via the antenna 225. For example, the control circuit 221 may calculate, based on the detection result by the acceleration sensor 222, motion information related to the motion by the user (e.g., information indicating that the user is walking or information indicating the number of steps taken by the user), or body motion information related to the body motion of the user during sleep (e.g., information indicating that the user turns over during sleep).

The control circuit 221 obtains a signal from input detection sections (specifically, the bottom surface input detection section 223, the side surface input detection section 25 and the top surface input detection section 41). This signal indicates, for example, the detection result of the input detection section, i.e., whether or not there are inputs to the buttons (specifically, the bottom surface button 6, the side surface button 4 and the top surface button 3). The control circuit 221, for example, executes a process based on the detection result or transmits the detection result to the information processing device described above via the antenna 225.

The control circuit 221 supplies power to the light-emitting sections (specifically, the side surface light-emitting section 224 and the top surface light-emitting section 42) to emit light. The control circuit 221 causes the light-emitting sections to emit light in response to the result of the process executed by the control circuit 221 or an instruction from the information processing device that is received via the antenna 225, for example.

4. Functions/Effects and Variations of Present Embodiment (Configuration Related to Arranging Rechargeable Battery 27 at an Angle)

As described above, in the embodiment described above, the electronic apparatus 1 includes the following elements:
a housing 2 having a top surface and a bottom surface and having a flat shape of which a length in an up-down direction is shorter than a length in a direction perpendicular to the up-down direction, wherein a cross-sectional shape thereof on a reference plane perpendicular to the up-down direction is a circular shape;
a charging terminal (i.e., the terminal 5) that is exposed on a side surface portion of the housing 2 between the top surface and the bottom surface;
a rechargeable battery 27 having a rectangular parallelepiped shape whose cross-sectional shape on the reference plane is a rectangular shape having a first long side and a first short side, wherein the rechargeable battery 27 is provided inside the housing 2 so that on the reference plane, the first long side is at an angle to a direction extending from a first position on the side surface portion (i.e., a front end position of the housing 2) at which the charging terminal is exposed toward a second position on the side surface portion (i.e., a rear end position of the housing 2) that is opposite from the first position (more specifically, a position that is opposite from the first position with respect to a center of the housing 2 as viewed from above); and
at least one of a vibrator 29 and a speaker 30 provided at a position that intersects with the reference plane and that is between the first long side of the rechargeable battery 27 and a portion of the side surface portion opposing the first long side, on the reference plane.

As described above, in the embodiment described above, as the rechargeable battery is arranged at an angle, it is easier to arrange the rechargeable battery and the charging terminal without interference. Moreover, by arranging the vibrator and/or the speaker between the rechargeable battery arranged at an angle and the housing, the rechargeable battery, the charging terminal, and the vibrator and/or the speaker can be arranged at a position intersecting with the reference plane. Thus, it is possible to reduce the size of the electronic apparatus, or to arrange larger components (e.g., the rechargeable battery, the vibrator, the speaker, etc.) in the housing. Thus, according to the embodiment described above, it is possible to improve the arrangement of elements inside the electronic apparatus.

Note that while the electronic apparatus 1 includes both the vibrator 29 and the speaker 30 in the embodiment described above, the electronic apparatus may include only one of the vibrator 29 and the speaker 30 in other embodiments. Even in this case, as in the embodiment described above, the arrangement of elements inside the electronic apparatus 1 can be improved by arranging the rechargeable battery 27 at an angle.

In the embodiment described above, the top surface of the housing 2 has a shape bulging in the upward direction, and the bottom surface thereof has a shape bulging in the downward direction. Note that the housing 2 may have at least one of the following shapes: a shape where the top surface bulges in the upward direction and a shape where the bottom surface bulges in the downward direction. When housing 2 has such a shape, the length of the housing 2 in the up-down direction near the outer circumference of the housing 2 as viewed from above is shorter than the length of the housing 2 near the center of the housing 2, so the space for arranging components inside the housing 2 near the outer circumference is restricted. In this regard, in the present embodiment, by arranging the rechargeable battery 27 at an angle as described above, it becomes easier to arrange components such as the charging terminal 5, the vibrator 29 and/or the speaker 30 even when the arrangement space is restricted.

In the embodiment described above, the electronic apparatus 1 further includes a first input section (i.e., the side surface button 4) that is provided at the second position and is used for making an operation input by the user. In the embodiment described above, by arranging the rechargeable battery 27 at an angle as described above, the first input section can be arranged on the side surface portion of the housing 2 so as not to interfere with the rechargeable battery 27.

In the embodiment described above, the electronic apparatus 1 further includes a second input section (i.e., the top surface button 3) provided on the top surface of the housing 2, and a first substrate (i.e., the upper substrate 40). The first substrate is provided on the top surface side relative to the rechargeable battery 27 inside the housing 2, and an input detection section that converts an input made on the second input section into a signal is provided on the first substrate. Then, by arranging the elements for detecting an input to the second input section together on the upper side of the rechargeable battery 27, it is possible to arrange the elements while making efficient use of the space in the housing.

Moreover, in the embodiment described above, the electronic apparatus 1 further includes a second substrate (i.e., the lower substrate 32) provided on the bottom surface side relative to the rechargeable battery 27 inside the housing 2. Then, by dividing the substrate into two, it is possible to reduce the size of one substrate, and it is possible to reduce the size of the electronic apparatus 1.

It can also be said that in the embodiment described above, the electronic apparatus 1 includes the following elements:
- a housing 2 having a top surface and a bottom surface and having a length in an up-down direction being shorter than a length in a direction perpendicular to the up-down direction, wherein the housing 2 has a circular shape as viewed from above;
- a rechargeable battery 27 provided inside the housing 2 and having a rectangular parallelepiped shape having a first long side and a first short side as viewed from above;
- a terminal 5 provided between the first long side and a portion of an outer circumference of the housing 2 that opposes the first long side as viewed from above, wherein at least a part of the terminal 5 is exposed; and at least one of a vibrator 29 and a speaker 30 provided between the first long side and a portion of an inner circumference of the housing 2 that opposes the first long side or between a second long side, which is an opposite side of the first long side, and a portion of the inner circumference of the housing 2 that opposes the second long side as viewed from above.

Note that in the present specification, "a component (specifically, the terminal 5, the vibrator 29 or the speaker 30) is provided between the long side of the rechargeable battery and the portion of the housing that opposes the long side" means that it is not required that the entirety of the component be present in the space as long as a part of the component is present between the long side of the rechargeable battery and the portion of the housing that opposes the long side.

As described above, in the embodiment described above, as the rechargeable battery 27 is arranged at an angle, it is easier to arrange the rechargeable battery 27 and the terminal 5 without interference. Moreover, by arranging the vibrator 29 and/or the speaker 30 between the rechargeable battery 27 arranged at an angle and the housing 2, it is easier to arrange the rechargeable battery 27 and the vibrator 29 and/or the speaker 30 without interference. Thus, according to the embodiment described above, it is possible to improve the arrangement of elements inside the electronic apparatus 1.

(Configuration Regarding Arrangement of Substrate and Rechargeable Battery 27, Etc.)

As described above, in the embodiment described above, the electronic apparatus 1 includes the following elements.
- a housing 2 having a top surface and a bottom surface and having a flat shape of which a length in an up-down direction is shorter than a length in a direction perpendicular to the up-down direction;
- a rechargeable battery 27 having a flat shape provided at a position that intersects with a reference plane perpendicular to the up-down direction inside the housing 2;
- a first substrate (i.e., the upper substrate 40) provided parallel to the reference plane on the top surface side relative to the rechargeable battery 27;
- a second substrate (i.e., the lower substrate 32) provided parallel to the reference plane on the bottom surface side relative to the rechargeable battery 27; and
- at least one of a vibrator 29 and a speaker 30 provided at a position that intersects with the reference plane.

It can also be said that in the embodiment described above, the electronic apparatus 1 includes the following elements:
- a housing 2 having a top surface and a bottom surface and having a length in an up-down direction being shorter than a length in a direction perpendicular to the up-down direction;
- a rechargeable battery 27 having a flat shape provided in a direction perpendicular to the up-down direction inside the housing 2;
- a first substrate (i.e., the upper substrate 40) provided parallel to the top surface on the top surface side relative to the rechargeable battery 27;
- a second substrate (i.e., the lower substrate 32) provided parallel to the bottom surface on the bottom surface side relative to the rechargeable battery 27; and
- at least one of a vibrator 29 and a speaker 30 provided between a side surface of the rechargeable battery 27 and an inner circumference of the housing 2.

With the configuration described above, by separately arranging the two substrates on both sides of the rechargeable battery 27, it is possible to efficiently arrange a substrate inside the housing 2. By arranging the vibrator 29 and/or the speaker 30 on the side of the rechargeable battery 27, it is possible to reduce the thickness of the electronic apparatus 1. Thus, according to the embodiment described above, it is possible to improve the arrangement of elements inside the electronic apparatus 1.

As described above, in the present embodiment, the reference plane is a plane perpendicular to the up-down direction for which the cross-sectional area of the internal space of the housing 2 along the plane is the largest. By arranging the rechargeable battery 27 and at least one of the vibrator 29 and the speaker 30 so as to intersect with this reference plane, it is possible to reduce the size of the electronic apparatus 1.

As described above, in the embodiment described above, the top surface and the bottom surface of the housing 2 have a shape bulging in the up-down direction, and the space for arranging components is restricted near the outer circumference inside the housing 2. In this regard, in the present embodiment, by arranging the rechargeable battery 27, the substrates, the vibrator 29 and/or the speaker 30 as described above, it is easier to arrange the components such as the rechargeable battery 27, the vibrator 29 and/or the speaker 30, it is easier to arrange the components such as the rechargeable battery 27, the vibrator 29 and/or the speaker 30 even when the arrangement space is restricted.

(Configuration Regarding Top Surface Button 3)

In the embodiment described above, the electronic apparatus 1 includes a button device (i.e., the top surface button 3, the top surface input detection section 41, the top surface light-emitting section 42 and the upper substrate 40) that includes the following elements:

a light-transmissive keytop (i.e., the top surface keytop 43);

a light-transmissive spacer 44 provided below the keytop; and a substrate provided below the spacer 44 and having a light-emitting section (i.e., the top surface light-emitting section 42) and a detection section (i.e., the top surface input detection section 41) on an upper surface, wherein the lower surface in the central portion of the keytop is located on the upper side relative to the lower surface of the outer edge portion around the central portion (see FIG. 12). The spacer 44 includes a protruding portion on the lower surface of the central portion of the spacer 44 that protrudes in the downward direction from the flat portion of the lower surface above the detection section, and the flat portion is located on the upper side relative to the lower surface of the outer edge portion around the central portion (see FIG. 12). The protruding portion presses the detection section in response to the movement of the spacer 44 in the downward direction due to the pressing of the keytop.

Note that "one component being located on the upper side of another component" means that the position of the first component for the up-down direction is upward of the position of the second component for the up-down direction, and is not meant to give limitation that the first component and the second component are arranged so that they overlap with each other as viewed from above (i.e., the first component is located above the second component).

With the configuration described above, by making the spacer 44 in such a shape described above (i.e., the lower surface of the central portion is located on the upper side of the lower surface of the outer edge portion), it is possible to reduce the possibility of an element (e.g., the spacer 44) hitting an element on the substrate (e.g., the light-emitting section). It is possible to reduce the thickness of the spacer 44 itself, and it is possible to reduce the thickness of the button device.

Note that the button device described above can also be used in an electronic apparatus different from the electronic apparatus 1 of the present embodiment. For example, the button device described above may be used in an electronic apparatus having a spherical housing. In this case, the direction in which the keytop, being pressed, moves is the downward direction, and the opposite direction to the downward direction is the upward direction.

In the embodiment described above, the electronic apparatus 1 includes a top surface on which the keytop of the button device is provided and a bottom surface having a shape bulging in the downward direction (see FIG. 1). Then, the electronic apparatus 1 is easily inclined at an angle, and if the keytop is pressed while the electronic apparatus 1 is placed on a flat surface so that the lower surface of the electronic apparatus 1 is in contact with the flat surface, the user is likely to press the keytop at an angle. If the keytop is pressed at an angle, there is a risk that other elements may hit the substrate. In this regard, in the embodiment described above, by making the spacer 44 in such a shape as described above, it is possible to reduce the possibility of other elements hitting the substrate even when the keytop is pressed at an angle.

(Variation Regarding Rechargeable Battery)

Note that in other embodiments, the electronic apparatus may be configured to include a housing case capable of accommodating a battery (meaning to include a rechargeable battery) instead of the rechargeable battery 27. That is, the electronic apparatus may be configured to include a power supply section, which is a housing case or a battery (a power supply section generically refers to a housing case and a battery).

The housing case removably accommodates the battery. The housing case has a rectangular parallelepiped shape as does the rechargeable battery 27. The housing case may have a flat shape of which the length in the up-down direction is shorter than the length in the direction perpendicular to the up-down direction. Note that if the electronic apparatus includes the housing case instead of the rechargeable battery 27, the electronic apparatus may not include the holder 28 or may include the holder 28. If the electronic apparatus does not include the holder 28, the housing case may include an arm portion similar to the first arm portion 123 of the holder 28 (i.e., an arm portion that extends above the vibrator 29 and presses the vibrator 29 from above). In this case, the housing case may include an arm portion similar to the second arm 124 of the holder 28 (i.e., an arm portion that extends above the speaker 30 and presses the speaker 30 from above).

If the electronic apparatus includes a housing case instead of the rechargeable battery 27, the electronic apparatus does not have to include a charging terminal. In this case, the electronic apparatus may include the terminal 5 similar to the embodiment described above, and the terminal 5 may be used for communication with other devices.

The housing case may have such a shape that one of the four side surfaces is open (i.e., one side surface is absent or a hole is formed in one side surface). In this case, a hole is formed in a portion of the housing that opposes the open side surface of the housing case, and the electronic apparatus includes a battery cover that is attached so as to cover the hole. The hole is sized so that a battery can be inserted into the housing case from outside the housing through the hole. The battery cover can be attached/detached to/from the housing. With the configuration described above, the user can easily replace the battery in the housing case.

Note that more specifically, the open side surface may be a side surface that is parallel to the short axis of the housing case. Then, the battery in the housing case can be replaced more easily because the vibrator and the speaker provided at a position that opposes the side surface parallel to the long axis of the housing case will not be in the way when taking out or removing the battery from the housing case.

In other embodiments, the housing case may have a shape that is open on the lower side as does the holder 28 in the embodiment described above. In this case, a hole is formed in a portion of the bottom surface of the housing that opposes the opening of the housing case, and the electronic apparatus includes a battery cover that is attached so as to cover the hole. Note that the lower substrate is arranged above the housing case (and below the upper substrate). The bottom surface button is provided in a portion of the bottom surface of the housing other than the hole (or a button with a similar function to the bottom surface button may be provided on the side surface portion or the top surface of the housing). Also with the configuration described above, the user can easily replace the battery in the housing case.

While the rechargeable battery 27, which is an example of a power supply section, has a shape that is rectangular as viewed from above in the embodiment described above, the shape of the power supply section is not limited to this. For example, in other embodiments, the power supply section may have a square shape as viewed from above. In this case, the power supply section does not have to be arranged so that the side parallel to the horizontal plane is at an angle to the front-rear direction. Note that regardless of the shape of the power supply section, the two substrates may be arranged separately on the upper side and on the lower side of the power supply section, thereby allowing for efficient arrangement of the substrates inside the housing.

(Variation Regarding Shape of Housing)

While the housing has a shape that is a flat shape as viewed from the horizontal direction and is a circular shape as viewed from above in the embodiment described above, the shape of the housing is not limited to this. The shape of the housing (which can also be referred to as the external shape of the electronic apparatus) may be, for example, any of the shapes to be shown below.

In other embodiments, the housing may have a shape that is formed by a curved line bulging outward as viewed from above and has a longitudinal direction (e.g., an elliptical shape or an egg shape). Even if the housing has such a shape, the power supply section can be easily arranged without interfering with other components (e.g., the terminal and/or the side surface button) by arranging so that the long axis of the power supply section is at an angle to the front-rear direction as in the embodiment described above.

Note that where the longitudinal direction of the housing coincides with the front-rear direction (that is, where the side surface button is provided at one end in the longitudinal direction, and the terminal is provided at the other end in the longitudinal direction), the power supply section may be arranged so that the long axis of the power supply section is at an angle to the front-rear direction and the long axis is closer to the longitudinal direction than the width direction of the housing (e.g., so that the angle formed between the long axis and the longitudinal direction is less than 45°). This makes it easy to arrange larger power supply sections.

The housing may have a four-sided shape as viewed from above. By separately arranging two substrates on the upper side and the lower side of the power supply section, irrespective of the shape of the housing as viewed from above, it is possible to efficiently arrange the substrates inside the housing.

In other embodiments, instead of a flat shape, the housing may have a shape of which the length in the up-down direction is equal to the length in the direction perpendicular to the up-down direction (e.g., a spherical shape). Note that when the housing has such a shape, the vibrator may be arranged below the power supply section. Note that the downward direction of the power supply section as used in this case is a direction that is perpendicular to the largest one of the surfaces of the power supply section having a rectangular parallelepiped shape and extends from the power supply section toward the lower substrate. In this case, the speaker may be arranged so as to extend in the downward direction from a position on the side of the power supply section. In this case, since there is likely a space for arranging components below the power supply section, it is easy to arrange larger vibrators or speakers by arranging a vibrator and a speaker as described above.

(Variation Regarding Arrangement of Side Surface Button and Terminal)

While the side surface button 4 and the terminal 5 are provided at positions in symmetry with respect to the center of the housing 2 as viewed from above in the embodiment described above, the arrangement of the side surface button and the terminal is not limited to this. For example, the side surface button may be provided at a position other than the rear end of the housing 2, and the terminal may be provided at a position other than the front end of the housing 2. The electronic apparatus may not include the side surface button or may not include the terminal. Note that if the electronic apparatus does not include the terminal on the side surface portion of the housing, the front-rear direction of the electronic apparatus may be defined with respect to the side surface button. For example, the rearward direction may be defined as a direction that is perpendicular to the up-down direction and extends from the center of the housing toward the side surface button, and the forward direction may be defined as the opposite direction to the rearward direction. Note that even if the positions of the side surface button and the terminal are different from the embodiment described above, the power supply section may be arranged so as not to interfere with the side surface button and the terminal. For example, the power supply section may be provided so that the side surface button and the terminal are arranged in the space (e.g., space A and/or space B shown in FIG. 9) between the side surface of the power supply section and a portion of the inner wall of the housing 2 (more specifically, the inner wall of the side surface portion of the housing 2) that opposes the side surface.

(Variation Regarding Input Section)

While each input section (i.e., the top surface button 3, the side surface button 4 and the bottom surface button 6) on which an operation input is made by the user is an input section of a type that can be pressed by the user in the embodiment described above, the type of the input section is not limited to this. For example, in other embodiments, the input section may be a slide switch or a touch button that detects a touch input by the user using a touch sensor. The input section may be an input section of a type that allows for a direction input (e.g., a joy stick). Moreover, the input section may be an input section of a type that can be pressed by the user and that allows for a direction input (e.g., a joy stick that allows for a press-down input). For example, the electronic apparatus may be configured to include a joy stick provided on the top surface instead of the top surface button.

Note that in other embodiments, there is no limitation on the size, the shape, the number, the position of installation and the method of installation of the elements to be provided on and inside the housing. The electronic apparatus may not include some of the elements in the embodiment described above or may not execute some of the processes executed in the embodiment described above. For example, in order to achieve some particular effects of the embodiment described above, the electronic apparatus only needs to include components for achieving the effects and execute processes for achieving the effects, and does not need to include other components or execute other processes. In other embodiments, the electronic apparatus may include components different from those of the embodiment described above.

The embodiment described above may be used in portable electronic apparatuses, for example, with the aim of improving the arrangement of elements inside the apparatus, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An electronic apparatus, comprising:
a housing having a top surface and a bottom surface and having a flat shape of which a length in an up-down direction is shorter than a length in a direction perpendicular to the up-down direction, wherein a cross-sectional shape thereof on a reference plane perpendicular to the up-down direction is a circular shape;
a charging terminal that is exposed on a side surface portion of the housing between the top surface and the bottom surface;
a rechargeable battery having a rectangular parallelepiped shape whose cross-sectional shape on the reference plane is a rectangular shape having a first long side and a first short side, wherein the rechargeable battery is inside the housing so that on the reference plane, the first long side is at an angle to a direction extending from a first position on the side surface portion at which the charging terminal is exposed toward a second position on the side surface portion that is opposite from the first position; and
at least one of a vibrator and a speaker at a position that intersects with the reference plane and that is between the first long side of the rechargeable battery and a portion of the side surface portion opposing the first long side, on the reference plane.

2. The electronic apparatus according to claim 1, comprising:
the speaker at a position that intersects with the reference plane and that is between the first long side of the rechargeable battery and a portion of the side surface portion opposing the first long side, on the reference plane; and
the vibrator at a position that intersects with the reference plane and that is between a second long side, which is an opposite side of the first long side, and a portion of the side surface portion opposing the second long side, on the reference plane.

3. The electronic apparatus according to claim 2, further comprising:
a holder that covers at least a part of the rechargeable battery,
wherein the holder holds at least one of the vibrator and the speaker from above.

4. The electronic apparatus according to claim 2, wherein the speaker and the vibrator are arranged staggered from each other with respect to a direction extending from the first position toward the second position.

5. The electronic apparatus according to claim 1, wherein on the reference plane, the first long side is oriented in a direction that is in middle between a direction extending from the first position toward the second position and a direction at right angle with respect to said direction.

6. The electronic apparatus according to claim 1, wherein on the reference plane, opposite ends of the first long side are close to or in contact with the housing.

7. The electronic apparatus according to claim 6, wherein a depression is formed on an inner wall of the housing at at least one position close to or in contact with a corner of the rechargeable battery.

8. The electronic apparatus according to claim 1, wherein the housing has at least one of following shapes: a shape where the top surface bulges in an upward direction and a shape where the bottom surface bulges in a downward direction.

9. The electronic apparatus according to claim 1, wherein:
the housing includes:
an upper housing having the top surface; and
a lower housing having the bottom surface;
one of the upper housing and the lower housing includes an engaging portion; and
the other one of the upper housing and the lower housing includes a receiving portion to which the engaging portion can engage.

10. The electronic apparatus according to claim 9, wherein one of the engaging portion and the receiving portion is on a portion of an inner wall of the housing that opposes a surface of the rechargeable battery including the first short side.

11. The electronic apparatus according to claim 1, further comprising a first input section that is at the second position and is used for making an operation input by a user.

12. The electronic apparatus according to claim 11, wherein the first input section extends from the second position to a position that is between a second long side, which is an opposite side of the first long side, and a portion of the side surface portion opposing the second long side, on the reference plane.

13. The electronic apparatus according to claim 11, wherein:
the first input section includes:
a keytop that can be pressed in a press-down direction extending from an outer side of the housing toward an inner side of the housing; and
a biasing portion that is on the inner side of the housing with respect to the keytop for biasing the keytop in an opposite direction to the press-down direction.

14. The electronic apparatus according to claim 11, wherein at least two openings are formed in the bottom surface on a side of the second position with respect to a center of gravity position of the electronic apparatus.

15. The electronic apparatus according to claim 14, further comprising:
a bottom forming portion that is on a far side of the two openings as the two openings are viewed from outside of the housing and that includes a first surface to be a bottom of the openings and a second surface facing in an opposite direction to the press-down direction,
wherein the biasing portion biases the keytop in an opposite direction to the press-down direction by being sandwiched between the second surface and the keytop.

16. The electronic apparatus according to claim 1, comprising:
the speaker at a position that intersects with the reference plane and that is between the first long side and a portion of the side surface portion opposing the first long side, on the reference plane,
wherein the speaker is at an angle in a rotation direction around an axis that is oriented in a direction closer to the first long side than to the first short side.

17. The electronic apparatus according to claim 16, wherein a sound hole is formed in the side surface portion at a position near the speaker.

18. The electronic apparatus according to claim 1, further comprising:
a second input section on the top surface; and
a first substrate on the top surface side relative to the rechargeable battery inside the housing, wherein an input detection section that converts an input made on the second input section into a signal is on the first substrate.

19. The electronic apparatus according to claim 18, further comprising a second substrate on the bottom surface side relative to the rechargeable battery inside the housing.

20. The electronic apparatus according to claim 1, wherein the electronic apparatus is a portable apparatus such that the entire housing can be held by a user with one hand.

21. An electronic apparatus, comprising:
- a housing having a top surface and a bottom surface and having a flat shape of which a length in an up-down direction is shorter than a length in a direction perpendicular to the up-down direction, wherein a cross-sectional shape thereof on a reference plane perpendicular to the up-down direction is a circular shape;
- a rechargeable battery or a battery housing section inside the housing and having a rectangular parallelepiped shape, which is a rectangular shape having a first long side and a first short side as viewed from above;
- a terminal between the first long side and a portion of an outer circumference of the housing that opposes the first long side as viewed from above, wherein a part of the terminal is exposed; and
- at least one of a vibrator and a speaker between the first long side and a portion of an inner circumference of the housing that opposes the first long side as viewed from above or between a second long side, which is an opposite side of the first long side, and a portion of the inner circumference of the housing that opposes the second long side as viewed from above.

* * * * *